US012594890B2

(12) United States Patent
Hall et al.

(10) Patent No.: US 12,594,890 B2
(45) Date of Patent: *Apr. 7, 2026

(54) REAR CARGO ATTIC TRAY SYSTEMS AND REAR CARGO ATTIC TRAYS

(71) Applicant: South East Manufacturing Inc., Wilson, NC (US)

(72) Inventors: Zachary Hall, Lucama, NC (US); Timothy Martin, New Bern, NC (US); Nicholas Martin, New Bern, NC (US)

(73) Assignee: South East Manufacturing Inc., Wilson, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/180,878

(22) Filed: Apr. 16, 2025

(65) Prior Publication Data

US 2025/0319822 A1     Oct. 16, 2025

Related U.S. Application Data

(60) Provisional application No. 63/634,707, filed on Apr. 16, 2024.

(51) Int. Cl.
B60R 7/04          (2006.01)
(52) U.S. Cl.
CPC .................................... B60R 7/04 (2013.01)
(58) Field of Classification Search
CPC ............... B60R 7/04; B60R 5/047; B60P 3/39
See application file for complete search history.

(56) References Cited

U.S. PATENT DOCUMENTS

| | | | | |
|---|---|---|---|---|
| 4,573,225 | A * | 3/1986 | Wolf ...................... | A47C 17/86 5/118 |
| 5,967,054 | A * | 10/1999 | Rosenfeld .............. | B60N 3/002 5/118 |
| 6,733,060 | B1 * | 5/2004 | Pavkov .................... | B60R 5/04 224/543 |
| 6,779,824 | B1 * | 8/2004 | Lazarevich .............. | B60R 7/02 296/57.1 |
| 11,458,903 | B2 * | 10/2022 | Anaya ....................... | B60R 5/04 |
| 11,613,198 | B1 * | 3/2023 | Carlseen .................. | B60P 3/39 296/165 |
| 11,833,955 | B1 * | 12/2023 | Sullivan ............... | B60N 2/3095 |

(Continued)

*Primary Examiner* — Brian D Nash
(74) *Attorney, Agent, or Firm* — Michael Best & Friedrich LLP

(57)          ABSTRACT

The present subject matter relates to rear cargo attic trays and attic tray systems to provide storage within a vehicle when needed. An attic tray system can include a tray body comprising a tray bed that forms a first tray bed surface. The tray body can have a front end, rear end and first and second sides. the attic tray system can also include at least two brackets. The least two brackets can provide support for the tray body in a storage position. Each of the least two brackets can be secured to a portion of a vehicle and on either the first side or the second side of the tray body, respectively. Further, the attic tray system can include a first latch secured to the first side of the tray body. The first latch can be configured to engage a first bracket of the least two brackets when the tray body is in the storage position and disengage the first bracket of the least two brackets when the tray body is being moved to a loading position.

20 Claims, 18 Drawing Sheets

(56)          References Cited

U.S. PATENT DOCUMENTS

| | | | |
|---|---|---|---|
| 12,179,702 B2* | 12/2024 | Ninamohina | B60R 5/045 |
| 12,304,367 B1* | 5/2025 | Sullivan | A47C 17/80 |
| 12,311,885 B2* | 5/2025 | Bonslaver | B60R 5/045 |
| 2006/0180623 A1* | 8/2006 | Reynolds | B60R 5/04 |
| | | | 224/543 |
| 2014/0159410 A1* | 6/2014 | Rasmussen | B60P 3/39 |
| | | | 296/24.33 |
| 2019/0092151 A1* | 3/2019 | Ramaswamy | B60J 7/196 |
| 2019/0126836 A1* | 5/2019 | Navarro | B60R 5/045 |
| 2020/0070730 A1* | 3/2020 | Gill | B60R 5/045 |
| 2020/0114802 A1* | 4/2020 | Laguana | B60P 3/39 |
| 2020/0172016 A1* | 6/2020 | Sanders | B60R 5/047 |
| 2021/0146844 A1* | 5/2021 | Smith | A47C 17/80 |
| 2021/0284084 A1* | 9/2021 | Myszkowski | B60R 13/0237 |
| 2022/0097611 A1* | 3/2022 | Clifford | B60R 5/04 |
| 2024/0140318 A1* | 5/2024 | Mcconnell | B60H 1/00564 |
| 2025/0145091 A1* | 5/2025 | Hall | B60R 11/06 |

* cited by examiner

REAR CARGO ATTIC TRAY SYSTEMS AND REAR CARGO ATTIC TRAYS

RELATED APPLICATIONS TECHNICAL FIELD

The presently disclosed subject matter claims the benefit of U.S. Provisional Patent Application Ser. No. 63/634,707, filed Apr. 16, 2024, the disclosure of which is incorporated herein by reference in its entirety.

TECHNICAL FIELD

The present subject matter relates to rear cargo attic tray systems to provide storage within a vehicle when needed and methods related to the rear attic cargo tray systems. In particular, the present subject matter relates to rear cargo attic tray systems that can be installed in the rear cargo bay of a sports utility vehicle in an upper portion of the rear cargo bay below the roof of the sports vehicle and that can be moved between a storage position and a loading position to allow easier placement of items on the attic tray for storage of the items.

BACKGROUND

Sports Utility Vehicles ("SUVs") have gained tremendous popularity over the past several years and have quickly become one of the most common body types you will see on the road. A big reason SUVs are so popular is due to versatility and cargo space. Smaller SUVs are great for commuters or small families that need a bit more room than a sedan or hatchback can provide. Many SUVs offer even more space inside the cabin, with a large range of sizes available, including compact and full-size mode. SUVs also tend to offer a wide range of drivetrain options. Front-wheel drive is common as an affordable and fuel-efficient option for drivers. All-wheel drive is a popular choice among SUV drivers in that it helps them handle the vehicle easier in slippery road conditions. Some SUVs offer rear-wheel drive. For drivers how enjoy outdoor activities, many SUVs offer four-wheel drive for enhanced performance.

Some SUVs, such as Jeeps® and the new Ford Broncos®, have been designed to be highly customizable with modular designs that permit companies to provide aftermarket parts and additional components that add features no offered on the respective vehicles by the manufacturer. For example, off-road modular SUV designs offer a user-friendly platform that can be stripped to its base structure so that alternate doors, fenders, and grille can be added in one afternoon. The following day, a whole new SUV can be reconfigured for another new adventure with a different body and roof setup. Such SUVs were designed and engineered from a clean slate to make off-road customization easy, quick, and attainable for all enthusiasts with a wide variety of interests and skill levels.

Some vehicles, such as Jeeps® and Ford Broncos®, have rear cargo areas behind the back seat that provides space for storage and hauling of a wide variety of cargo. While the rear cargo area can generally provide more cargo space than a trunk of a car, the shape of the space with a taller height component can lead to unused space depending on the items being hauled in the cargo space. Stationary attic trays have been provided to provide an extra surface space to places items up close to the inner portion of the roof right below the headliner of the vehicle while leaving a larger cargo bay below. These attic trays can be difficult to load with items for storage, however, because the front holding wall of the attic tray is closer to the headliner of the vehicle and reside close to the upper rim wall of the roof of the vehicle. Thus, there is little space between the upper front holding wall of the attic tray and the upper rim wall of the roof of the vehicle making the attic tray awkward to load. the taller spaced provided be the full cargo space is needed for the hauling of some items, even for flat items with a small thickness. Items that may fit in the space provided by the attic tray, but have thick greater than the distance between the front holding wall and headliner, are just about impossible to load on the attic tray. In such instances, the stationary trays must be removed and stored.

As such, a need exists for rear cargo attic tray systems that allows for easier loading and unloading.

SUMMARY

The present subject matter relates to rear cargo attic tray systems to provide storage within a vehicle when needed and methods related to the rear attic cargo tray systems. In particular, the present subject matter relates to rear cargo attic tray systems that can be installed in the rear cargo bay of a sports utility vehicle in an upper portion of the rear cargo bay below the roof of the sports vehicle and that can be moved between a storage position and a loading position to allow easier placement of items on the attic tray for storage of the items. Methods related to the use and assembly of the rear cargo attic tray systems disclosed herein are also provided.

Thus, it is an object of the presently disclosed subject matter to provide rear cargo attic tray systems to provide extra storage surface within a vehicle when needed as well as methods related thereto. While one or more objects of the presently disclosed subject matter having been stated hereinabove, and which is achieved in whole or in part by the presently disclosed subject matter, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

Figure 1A:
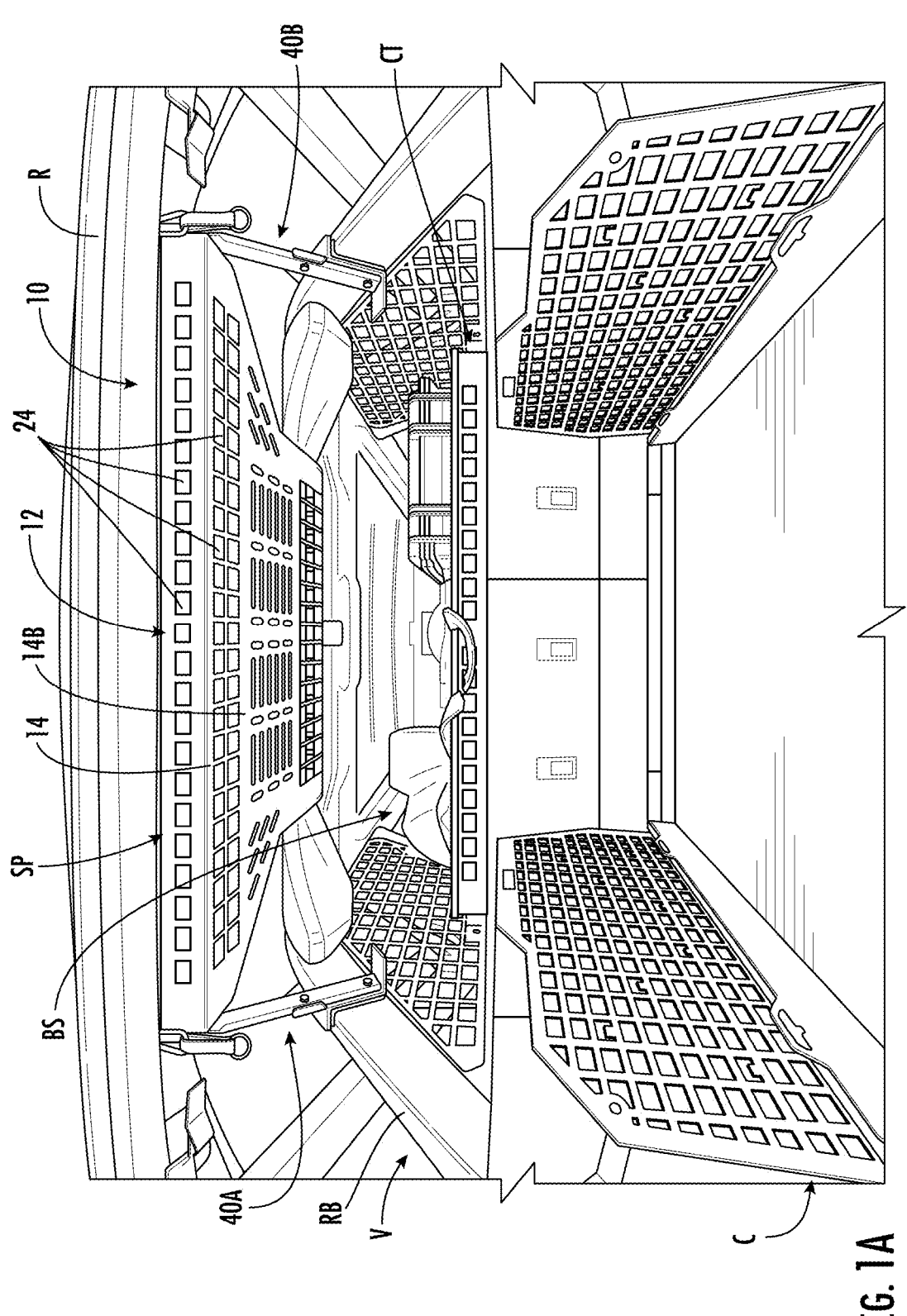
FIGS. 1A and 1B illustrate perspective views of a rear cargo area of a vehicle having an embodiment of an attic tray system according to present subject matter installed therein with FIG. 1A showing the attic tray system in a storage position and FIG. 1B showing the attic tray system in a loading position.

Repeat use of reference characters in the present specification and drawings is intended to represent the seam or analogous features or elements of the present subject matter.

DETAILED DESCRIPTION

Reference now will be made to the embodiments of the present subject matter, one or more examples of which are set forth below. Each example is provided by way of an explanation of the present subject matter, not as a limitation. In fact, it will be apparent to those skilled in the art that various modifications and variations can be made in the present subject matter without departing from the scope or spirit of the present subject matter. For instance, features illustrated or described as one embodiment can be used on another embodiment to yield still a further embodiment. It is to be understood by one of ordinary skill in the art that the present discussion is a description of exemplary embodiments only, and is not intended as limiting the broader aspects of the present subject matter, which broader aspects are embodied in exemplary constructions.

Although the terms first, second, right, left, front, back, top, bottom, etc. may be used herein to describe various features, elements, components, regions, layers and/or sections, these features, elements, components, regions, layers and/or sections should not be limited by these terms. These terms are only used to distinguish one feature, element, component, region, layer or section from another feature, element, component, region, layer, or section. Thus, a first feature, element, component, region, layer, or section discussed below could be termed a second feature, element, component, region, layer, or section without departing from the teachings of the disclosure herein.

Similarly, when a feature or element is being described in the present disclosure as "on" or "over" another feature or element, it is to be understood that the features or elements can either be directly contacting each other or have another feature or element between them, unless expressly stated to the contrary. Thus, these terms are simply describing the relative position of the features or elements to each other and do not necessarily mean "on top of" since the relative position above or below depends upon the orientation of the device to the viewer.

Embodiments of the subject matter of the disclosure are described herein with reference to schematic illustrations of embodiments that may be idealized. As such, variations from the shapes and/or positions of features, elements, or components within the illustrations as a result of, for example but not limited to, user preferences, manufacturing techniques and/or tolerances are expected. Shapes, sizes and/or positions of features, elements or components illustrated in the figures may also be magnified, minimized, exaggerated, shifted, or simplified to facilitate explanation of the subject matter disclosed herein. Thus, the features, elements or components illustrated in the figures are schematic in nature and their shapes and/or positions are not intended to illustrate the precise configuration of the subject matter and are not necessarily intended to limit the scope of the subject matter disclosed herein unless it specifically stated otherwise herein.

As used herein, the term a "plurality" means two or more.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "~" means "about" or "approximately."

It is to be understood that the ranges and limits mentioned herein include all ranges located within the prescribed limits (i.e., subranges). For instance, a range from about 100 to about 200 also includes ranges from 110 to 150, 170 to 190, 153 to 162, and 145.3 to 149.6. Further, a limit of up to about 7 also includes a limit of up to about 5, up to 3, and up to about 4.5, as well as ranges within the limit, such as from about 1 to about 5, and from about 3.2 to about 6.5.

The present disclosure is related to rear cargo attic tray systems to provide storage within a vehicle proximate to the roof the vehicle that can be easily loaded with items and methods related to the rear cargo attic tray systems. For example, an attic tray system can be provided that can be installed in the rear cargo bay of a sports utility vehicle that can have storage position that can be about horizontal for storing small or relatively flat items and a loading position that can be an angle to more easily place the items to be stored on the tray. The attic tray systems can be installed in the rear cargo bay of a sports utility vehicle, for example.

Thus, the present disclosure is related to rear cargo tray systems that provides both a storage position and a loading position. For example, in some embodiments, an attic tray system for a rear cargo area of a vehicle can comprise a tray bed that forms a first tray bed surface and an opposing second tray bed surface. The tray body having a front end, rear end and first and second sides. The tray body can be pivotally connected at the rear end of the tray body to a portion of a vehicle in which the tray body is installed. In this manner, the tray body is movable between a loading position and a storage the position.

In some embodiments, an attic tray system for a rear cargo area of a vehicle cab be provided. The attic tray system can comprise a tray body that can comprise a tray bed that forms a first tray bed surface and an opposing second tray bed surface. The tray body can have a front end, rear end and first and second sides. The attic tray system can comprise at least two brackets for supporting the tray body in a storage position. Each of the least two brackets can be secured to a portion of a vehicle on either the first side or the second side of the tray body, respectively. Further, the attic tray system can comprise a first latch secured to the first side of the tray body. The first latch can be configured to engage a first bracket of the least two brackets when the tray body is in the storage position and disengage the first bracket of the least two brackets when the tray body is being moved to a loading position. In some embodiments, the at least two brackets each can comprise a pivot portion, respectively, that can be rotatably attached to the first and second sides of the tray body respectively, such that the tray body is rotatable between a storage position and a loading position about the at least two brackets. In some embodiments, a first bracket of the at least two brackets can comprise a latching portion comprising a latch arm configured to engage the first latch on the first side of the tray body. In some embodiments, a second latch can be secured to the second side of the tray body with the second latch being configured to engage a second bracket of the least two brackets when the tray body is in the storage position and disengage the second locking bracket when the tray body is being moved to the loading position. In such embodiments, the at least two brackets each can comprise a latching portion comprising a latch arm configured to engage the respective first and second latches on the respective first and second sides of the tray body.

In some embodiments, an attic tray system for a rear cargo area of a vehicle can comprise a tray body that can comprise a tray bed that forms a first tray bed surface and an opposing second tray bed surface. The tray body can have a front end, rear end, and first and second sides. The attic tray system can also comprise first and second rear pivot brackets. The first and second rear pivot brackets can be secured to a portion of a vehicle. The first and second rear pivot brackets can be attached to the first and second sides of the tray body, respectively, such that the tray body can be rotated between a storage position and a loading position about the first and second rear pivot brackets. Additionally, the attic tray system can comprise first and second locking brackets for supporting the tray body in the storage position. Each of the first and second locking brackets can be secured to a portion of a vehicle on either the first side or the second side of the tray body, respectively. Further, the attic tray system can also comprise a first latch secured to the first side of the tray body and a second latch secured to the second side of the tray body. The first latch is configured to engage the first locking bracket when the tray body is in the storage position and disengage the first locking bracket when the tray body is being moved to the loading position. Similarly, the second latch is configured to engage the second locking bracket when the tray body is in the storage position and disengage the second locking bracket when the tray body is being moved to the loading position.

Figure 1B:
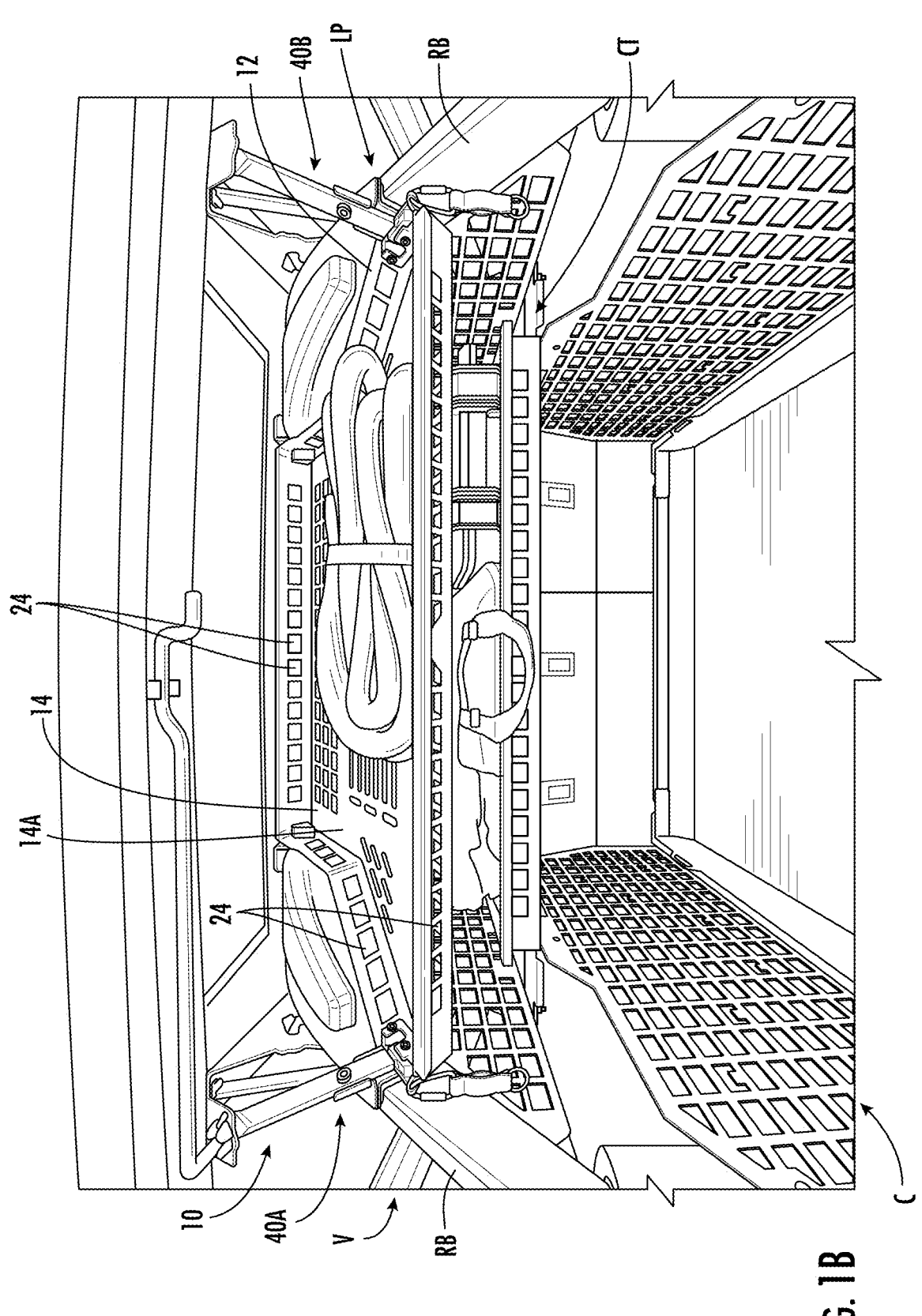

Referring to FIGS. 1A-1B, images of a vehicle, in particular, an SUV V, such as a Ford Bronco®, showing a rear cargo area, or bay, with a rear cargo tray system, generally, CT installed therein. The rear cargo tray system CT can be installed in an interior portion of the SUV V in the rear cargo area C behind the back seat BS of the SUV V. For example, the rear cargo tray system CT can be secured to interior side walls of the SUV V. Additionally, a rear cargo attic tray system 10 can also be installed in the interior portion of the SUV V in the rear cargo area C behind the back seat BS of the SUV V above the rear cargo tray system CT. The attic tray system 10 can be positioned in with the interior portion of the rear cargo area C of the SUV V such that, when the attic tray system 10 is in a storage position SP as shown in FIG. 1A, the attic tray system 10 is proximate to and can be about parallel to the interior of the roof R of the SUV V. The attic tray system 10 can be secured to wall structures of the SUV V. For example, the attic tray system 10 can be secured to one or more roll bars RB in the rear cargo area C of the SUV V. The attic tray system 10 can comprise a tray body 12 that includes a tray bed 14 with opposing tray bed surfaces 14A, 14B on which items can be placed or secured. Unlike other attic trays, the attic tray system 10 allows for much easier loading and retrieval of items to be store on the tray body 12. In particular, the tray body 12 of the attic tray system 10 can be moved from the storage position SP as shown in FIG. 1A to a loading position LP as shown in FIG. 1B to allow more space for loading items unto the tray bed 14 of the tray body 12. Once the tray bed 14 of the tray body 12 is loaded, the tray body 12 can be moved back to the storage position SP as shown in FIG. 1A. In this manner, a versatility of the attic tray system 10 is increased by allowing larger items to be placed onto the tray bed 14 of the tray body 12.

The tray body 12 can have depth $D_{TB}$ as measured from rear holding wall 18 to the front holding wall 16. The tray depth $D_{TB}$ can be determined based on the space available near the roof R and in the rear cargo area C of the vehicle V. The tray body 12 can have a width $W_{RT}$ as measured along the rear end 12B of the tray body 12 or the rear holding wall 18 and a width $W_{FT}$ as measured along the front end 12A of the tray body 12 or the front holding wall 16. The width $W_{FT}$ at the front end 12A of the tray body 12 can be great than the width $W_{RT}$ at the rear end 12B of the tray body 12. The width $W_{RT}$ and the width $W_{FT}$ can be determined based on the based on the space available near the roof R and in the rear cargo area C of the vehicle V, for example between the roll bars RB.

Referring to FIGS. 2A-11, the attic tray system 10 for a rear cargo area C of a vehicle V can comprise the tray body

US 12,594,890 B2

7

Figure 2A:
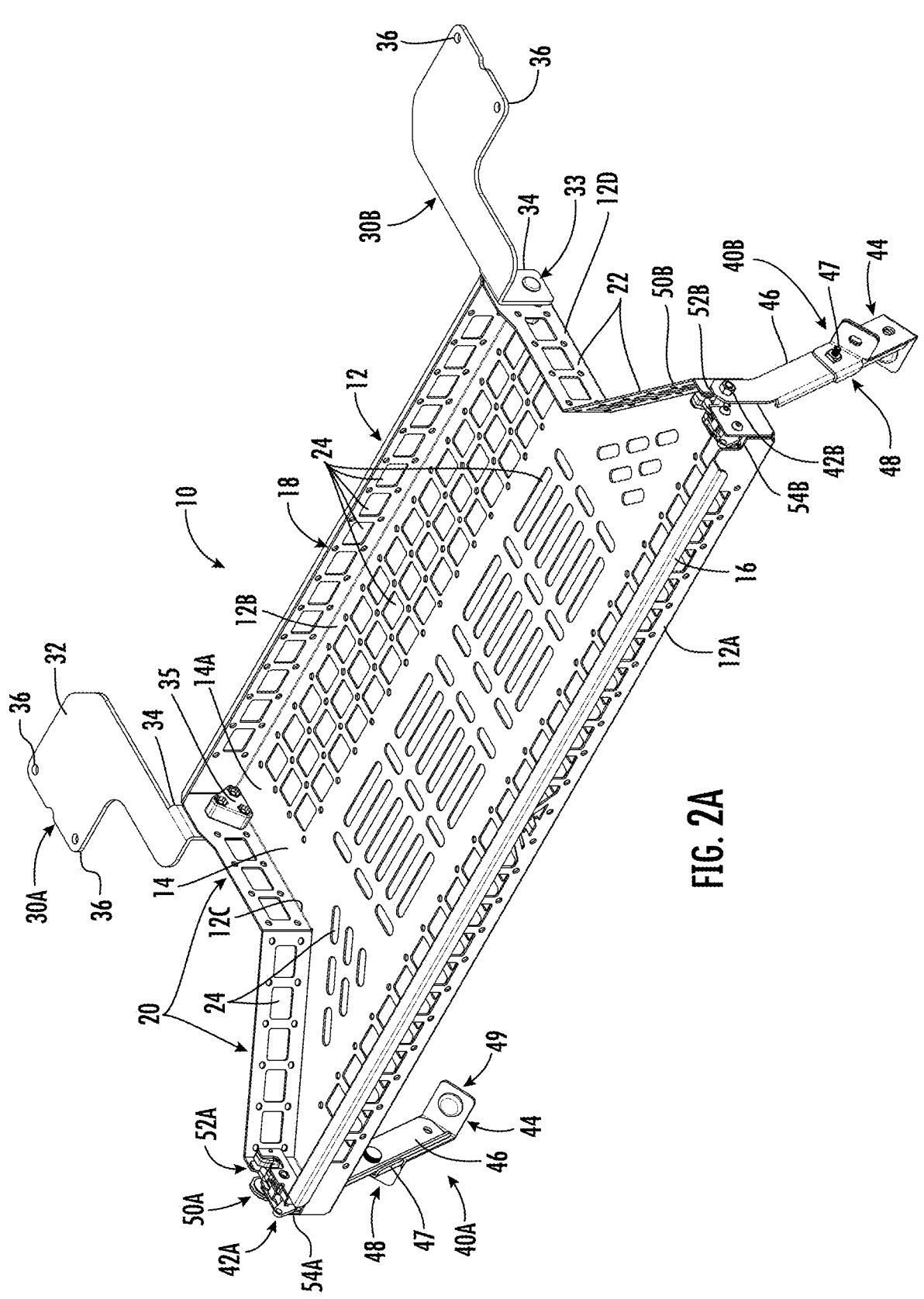
FIG. 2A illustrates a perspective view of an embodiment of an attic tray system according to the present subject matter.
Figure 2B:
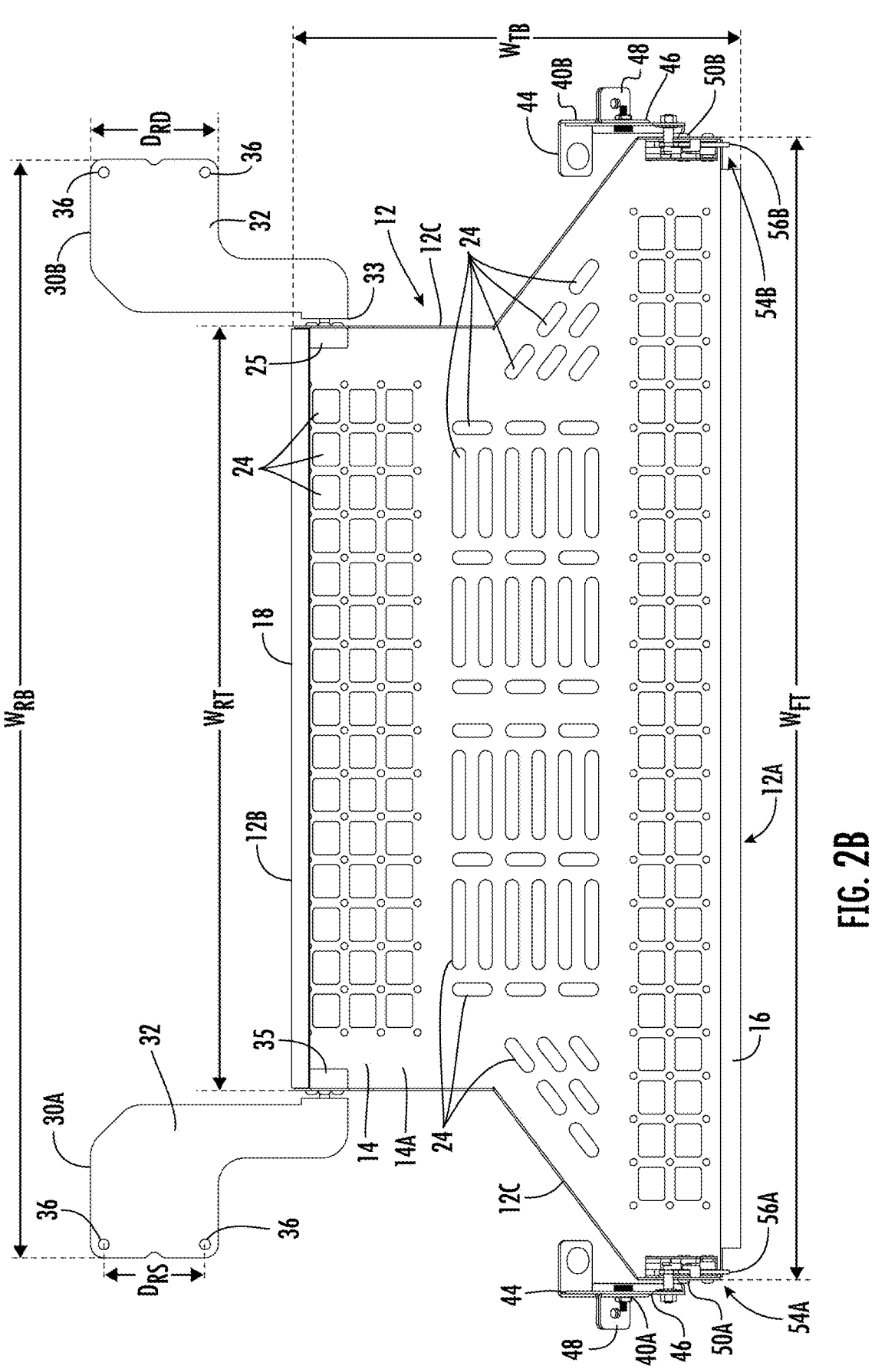
FIG. 2B illustrates a top plan view of the embodiment of the attic tray system according to FIG. 2A.

12 with the tray bed 14 that forms the first tray bed surface 14A on which items can be loaded and the opposing second tray bed surface 14B. The tray body 12 can have a front end 12A, rear end 12B, and first and second sides 12C, 12D. The attic tray system 10 can also comprise first and second rear pivot brackets 30A, 30B as shown in FIGS. 2A and 2B. The first and second rear pivot brackets 30A, 30B can be secured to the interior portion of the vehicle V. For example, the first and second rear pivot brackets 30A, 30B can be secured within the vehicle V near the roof R of the vehicle V. In some embodiments, the first and second rear pivot brackets 30A, 30B can be secured to a top portion of the roll bars RB of the vehicle V proximate to the roof R of the vehicle V. The first and second rear pivot brackets 30A, 30B can be attached to the first and second sides 12C, 12D of the tray body 12, respectively, such that the tray body 12 can be rotated about the first and second rear pivot brackets 30A, 30B between the storage position SP and the loading position LP as shown in FIGS. 1A, 1B, 2C, and 2D. Referring to FIGS. 2A-2D and FIG. 4, each of the first and second rear pivot brackets 30A, 30B can comprise a bracket body 32 that can be secured to the vehicle V and a flange 34 that extends downward from the bracket body 32. The bracket bodies 32 can have holding apertures 36 for receiving fasteners (not shown) to secure the respective first and second rear pivot brackets 30A, 30B to the vehicle V. Each flange 34 can have a pivot 33 that extends therefrom that can engage the first and second sides 12C, 12D of the tray body 12 near the rear end 12B of the tray body 12. In particular, the side walls 20, 22 can have apertures therethrough and the pivots 33 can engage hinge blocks 35 secured to the side walls 20, 22 of the tray body 12 that facilitate the rotation of the tray body 12 about the pivots 33 in the flanges 34 of the first and second rear pivot brackets 30A, 30B. The flanges 34 can have can pivot apertures 38 therein for receiving and securing the pivots 33.

A width $W_{RB}$ as measure between outer ends of the bracket bodies 32 of the first and second rear pivot brackets 30A, 30B can be greater than the width $W_{RT}$ of the rear end 12B of the tray body 12. The bracket bodies 32 of the first and second rear pivot brackets 30A, 30B can comprise a depth $D_{RD}$ that promote a stable connection between the first and second rear pivot brackets 30A, 30B and the portion of the vehicle V to which it is secured. Similarly, a distance $D_{RS}$ between holding apertures 36 on a bracket body 32 can help to promote a stable connection between the first and second rear pivot brackets 30A, 30B and the portion of the vehicle V to which it is secured.

Additionally, the attic tray system 10 can comprise first and second locking brackets 40A, 40B for supporting the tray body 12 in the storage position SP. Each of the first and second locking brackets 40A, 40B can be secured to a portion of a vehicle V on either the first side 12C or the second side 12D of the tray body 12, respectively. Further, the attic tray system 10 can also comprise a first latch 50A secured to the first side 12C of the tray body 12 and a second latch 50B secured to the second side 12D of the tray body 12. The first latch 50A is configured to engage the first locking bracket 40A when the tray body 12 is in the storage position SP and disengage the first locking bracket 40A when the tray body 12 is being moved to the loading position LP. Similarly, the second latch 50B is configured to engage the second locking bracket 40B when the tray body 12 is in the storage position SP and disengage the second locking bracket 40B when the tray body 12 is being moved to the loading position LP.

8

Figures 2C, 2D:
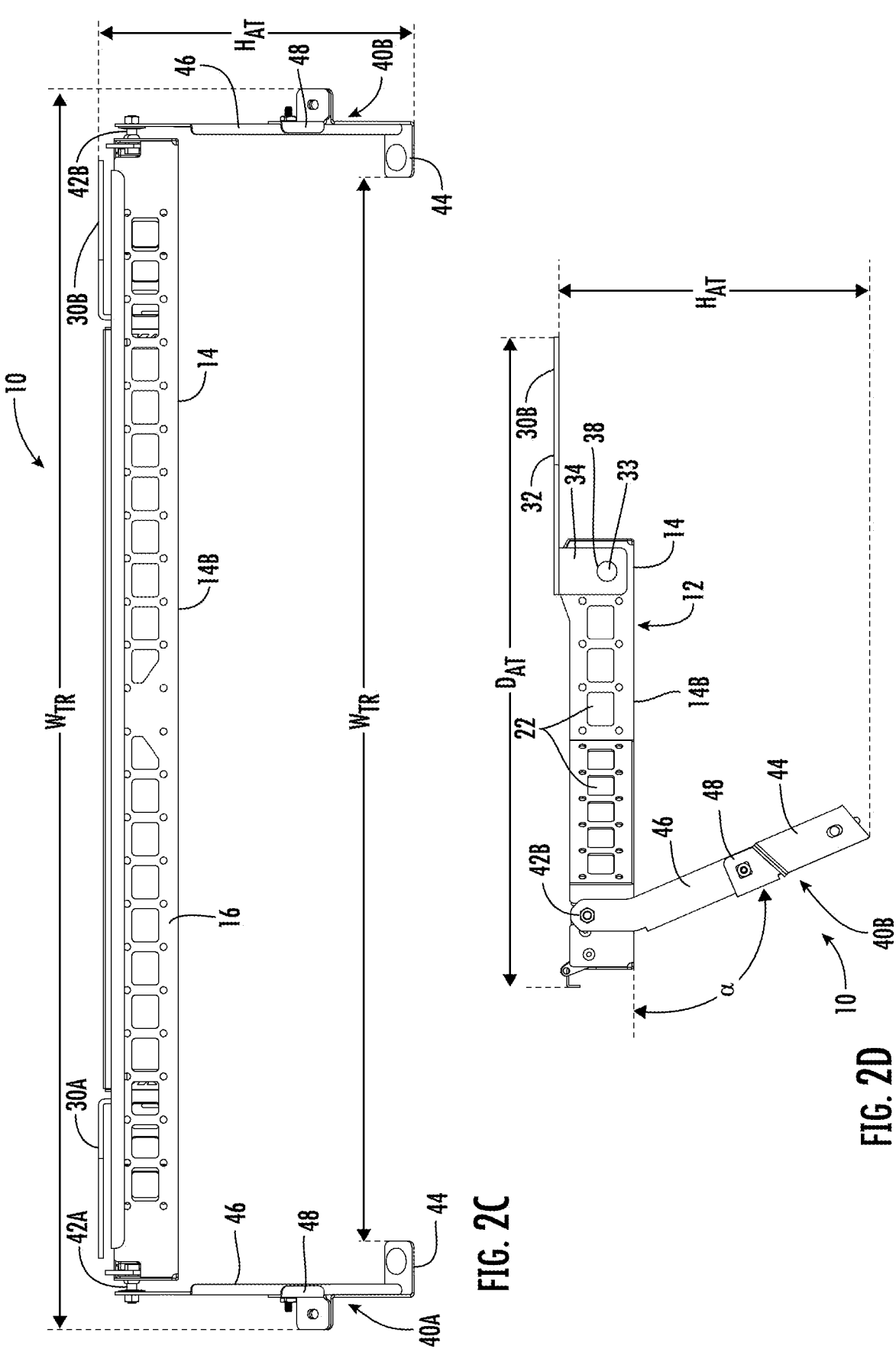
FIG. 2C illustrates a top front plan view of the embodiment of the attic tray system according to FIG. 2A.
FIG. 2D illustrates a side plan view of the embodiment of the attic tray system according to FIG. 2A.
Figure 3:
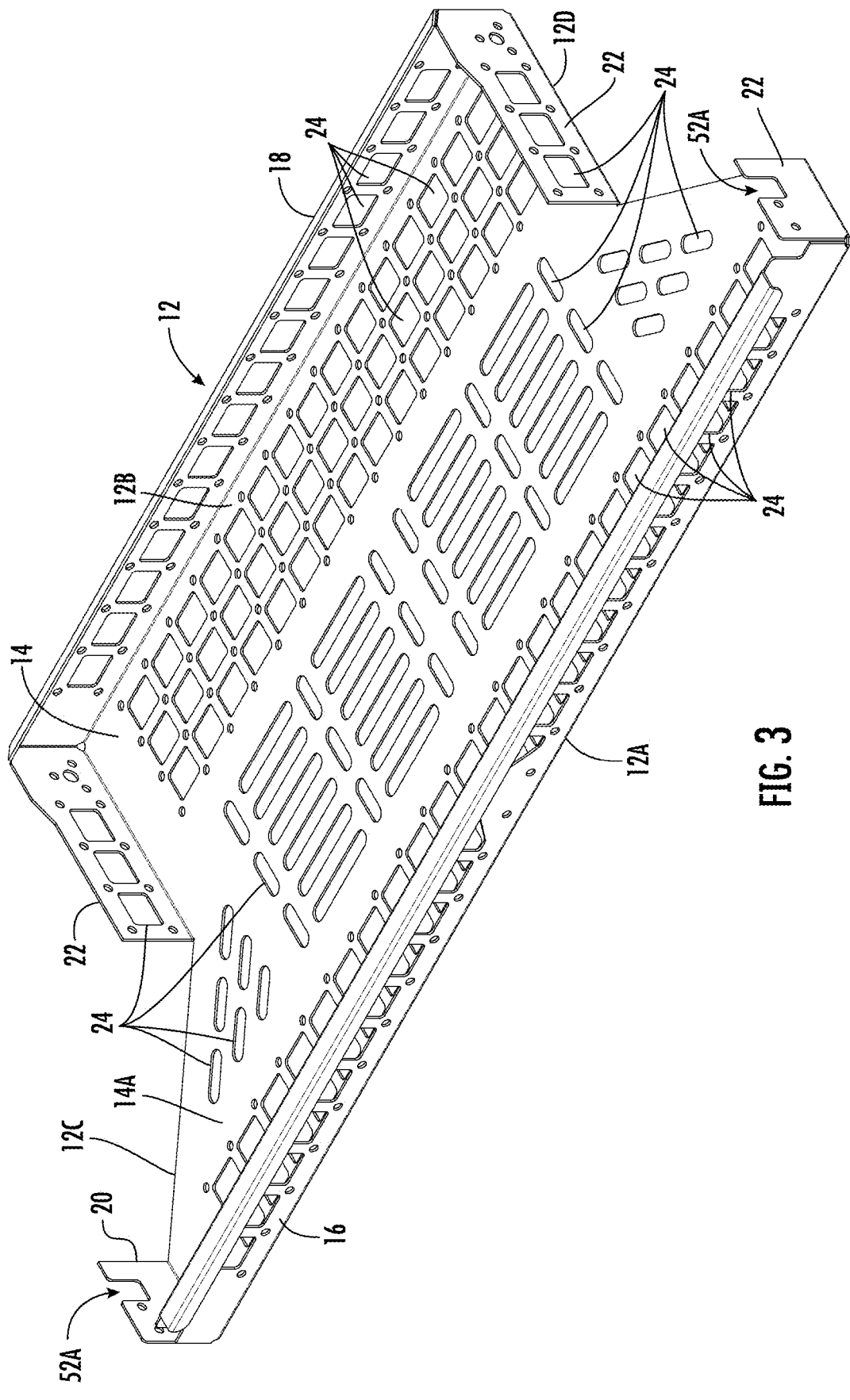
FIG. 3 illustrate a perspective view of an embodiment of a tray body according to the present subject matter that can be used in the attic tray system according to FIG. 2A.

As shown in FIGS. 2C-2D and 3, the tray body 12 can comprise a front holding wall 16 extending upward from the front end 12A of the tray body 12 above the first tray bed surface 14A and a rear holding wall 18 extending upward from the rear end 12B of the tray body 12 above the first tray bed surface 14A. The tray body 12 can comprise first and second side walls 20, 22 that extend between the front and rear holding walls 16, 18. As shown in FIGS. 2A and 2B, in some embodiments, the first latch 50A can be position along the first side wall 20 proximate to the front holding wall 16. Similarly, the second latch 50B can be position along the second side wall 22 proximate the front holding wall 16. In such embodiments, the first rear pivot bracket 30A is secured to the first side wall 20 proximate the rear holding wall 18 and the second rear pivot bracket 30B can be secured to the second side wall 22 proximate the rear holding wall 18. In this manner the tray body 12 can pivot along an axis formed by the connection between the side walls 20, 22 and the first and second rear pivot brackets 30A, 30B between the storage position SP and the loading position LP. The first and second latches 50A, 50B can engage the first and second locking brackets 40A, 40B to hold the tray body 12 in the storage position SP when the tray body 12 is moved to the storage position SP. When the tray body 12 is to be pivoted to loading position LP, the first and second latches 50A, 50B can disengage the first and second locking brackets 40A, 40B. To protect the first and second latches 50A, 50B and facilitate their engagement and disengagement, each of the first and second side walls 20, 22 of the tray body 12 can comprise a locking channel 52A, 52B proximate the front holding wall 16. In particular, in such embodiments, the first and second latches 50A, 50B are respectively aligned with the locking channels 52A, 52B of the first and second side walls 20, 22 for receiving a portion of the first and second locking brackets 40A, 40B, such as the latch arms 42A, 42B of the first and second locking brackets 40A, 40B. In some such embodiments, the front holding wall 16 can comprise release channels 54A, 54B therein in which release levers 56A, 56B of the respective first and second latches 50A, 50B extend for releasing the first and second latches 50A, 50B from the respective first and second locking brackets 40A, 40B.

As can be seen in FIGS. 2A-2D and 3, in some embodiments, the tray body 12 can comprises MOLLE apertures 24 on at least one of the tray bed 14, the first and second side walls 20, 22, the front holding wall 16 or the rear holding wall 18.

Figures 4, 5A, 5B, 5C:
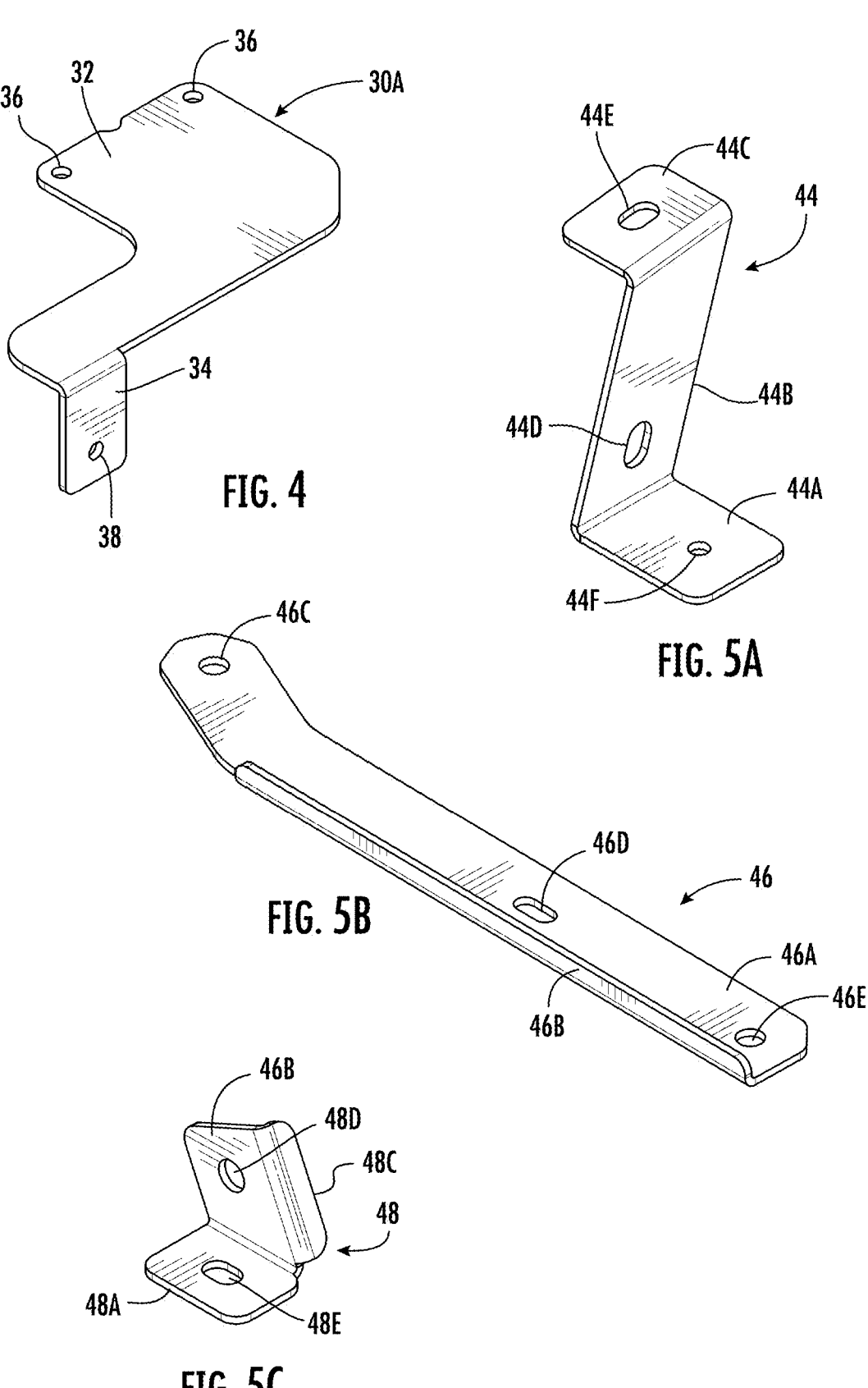
FIG. 4 illustrate a perspective view of an embodiment of a rear pivot bracket according to the present subject matter that can be used in the attic tray system according to FIG. 2A.
FIGS. 5A, 5B, and 5C illustrate perspective views of embodiments of brackets that can be used in a locking bracket according to the present subject matter that can be used in the attic tray system according to FIG. 2A.

As shown in FIGS. 2A-2D and 5A-5C, each of the first and second locking brackets 40A, 40B comprise a vehicle connection bracket 44 and a latch arm connection bracket 46 and a bracing bracket 48. The vehicle connection brackets 44 can be configured to secure to a portion of the vehicle V in which the attic tray system 10 is being installed. The latch arm connection brackets 46 can comprise the respective latch arms 42A, 42B that can engage with one of the first and second latches 50A, 50B. The latch arm connection brackets 46 can be configured to be secured the respective vehicle connection bracket 44. When the vehicle connection brackets 44 are secured to the vehicle V and latch arm connection brackets 46 are secured to the vehicle connection brackets 44, the latch arms 42A, 42B of the latch arm connection brackets 46 can be in an alignment with the respective first and second rear pivot brackets 30A, 30B so that the tray body 12 is held in the storage position SP when the first and second latches 50A, 50B engage the latch arms 42A, 42B of the latch arm connection brackets 46 of the first and second locking brackets 40A, 40B. As can be seen in FIGS. 2A, 2B and 5A, each of the vehicle connection brackets 44 of the first and second locking brackets 40A, 40B can have a tray rest 44A extending therefrom. Thus, upon installation, the tray rest 44A extends inward from and below respective latch arm connect bracket 46 such that the opposing second tray bed surface 14B of the tray body 12 can rest against the tray rests 44A when the tray body 12 is in the loading position LP.

Additionally, in some embodiments, the vehicle connection brackets 44 of the first and second locking brackets 40A, 40B are securable to opposing roll bars RB of the vehicle V and the latch arm connection brackets 46 extend above the respective roll bars RB such that the latch arms 42A, 42B of the latch arm connection brackets 46 are above the respective roll bars RB of the vehicle V. In some embodiments, each of the vehicle connection brackets 44 of the first and second locking brackets 40A, 40B can comprise a bracket body 44B and a flange 44C extending outward from the bracket body 44B. The bracket body 44B can have a planar body shape that can extend along an axis with the flange 44C extending outward therefrom. In some embodiments, the flange 44C can extend outward at about a 90° angle from the bracket body 44B. The bracket body 44B can be secured to a side portion of the respective roll bar RB and the flange 44C can be secured to a top portioned the respective roll bar RB. As stated above, each of the first and second locking brackets 40A, 40B can comprise a bracing bracket 48 that can be attached the latch arm connection bracket 46 of the respective first and second locking brackets 40A, 40B to brace to the portion of the latch arm connection bracket 46 that extends above the roll bar RB of the vehicle V. Additionally, the bracing bracket 48 can help secure the latch arm connection bracket 46 to the vehicle connection brackets 44 and the roll bar RB above the roll bar RB. For example, in some embodiments, the bracing bracket 48 can comprise a first flange 48A and a second flange 48B extending from the first flange 48A. The first flange 48A of the bracing bracket 48 can be secured to the flange 44C of the vehicle connection bracket 44 and the second flange 48B of the bracing bracket 48 can be secured to the latch arm connection bracket 46 above the top portion of the roll bar RB.

In some embodiments, to facilitate the formation and placement of the first and second locking brackets 40A, 40B, each of the vehicle connection brackets 44 can have a securement aperture 44D in the bracket body 44B and a securement aperture 44E in the flange 44C for receiving fasteners for securing the vehicle connection brackets 44 to the vehicle. Similarly, in some embodiments, each of the latch arm connection brackets 46 can have a securement aperture 46E that is alignable with the securement aperture 44D of the vehicle connection brackets 44. A fastener can be inserted into both the securement aperture 44D and the securement aperture 46E such that the latch arm connection brackets 46 extends above the vehicle connection brackets 44. In some embodiments where a bracing bracket 48 is used, the first flange 48A can have a securement aperture 48E therein that can be aligned with the securement aperture 44E in the flange 44C such that second flange 48B of the bracing bracket 48 extends above the respective vehicle connection bracket 44 when a fastener is inserted therethrough to hold both the bracing bracket 48 and the vehicle connection bracket 44 to the vehicle V. A securement aperture 46D can be provided in each of the latch arm connection brackets 46 and a securement aperture 48D can be provide in the second flange 48B of each bracing bracket 48 that can be aligned for receiving a fastener 47 therein to hold the respective latch arm connection bracket 46 and the bracing bracket 48 together above the respective vehicle connection bracket 44.

Referring to FIGS. 2A and 5A, the bracket body 44B can also incorporate an aperture 44F on the tray rest 44A. In some embodiments, this aperture 44F can be configured receive a bumper or guard 49 on which the tray body 12 can rest in the loading position LP. Referring to FIG. 5B, each of the latch arm connection brackets 46 can have a securement aperture 46C therein for incorporating the respective latch arm 42A, 42B therein such that the respective latch arm 42A, 42B extends outward from the respective latch arm 42A, 42B above the respective vehicle connection brackets 44 and the bracing bracket 48 when the respective locking bracket 40A, 40B is formed and secured to eh the vehicle V. As shown in FIGS. 2D and 5B, the latch arm connection brackets 46 can be angled. For example, in some embodiments, the latch arm connection brackets 46 can be angled such that the first and second locking brackets 40A, 40B extend downward at obtuse angles $\alpha$ as measured from a plane about parallel with the tray bed 14 that extends outward from the front end 12A of the tray body 12.

As shown in FIG. 2C, the distance $W_{TR}$ between the tray rest 44A of the first and second locking brackets 40A, 40B can be less than the width $W_{FT}$ of the front end 12A of the tray body 12 so that the tray rests 44A provide support for the tray body 12 when the tray body 12 is in the loading position LP. The attic tray system 10 can have a width $W_{AT}$, a depth $D_{AT}$, and a height $H_{AT}$. The width $W_{AT}$, the depth $D_{AT}$, and the height $H_{AT}$ can depend on the space available near the roof R and in the rear cargo area C of the vehicle V and where and how the attic tray system 10 is secured within the interior portion of the vehicle V.

Figure 6:
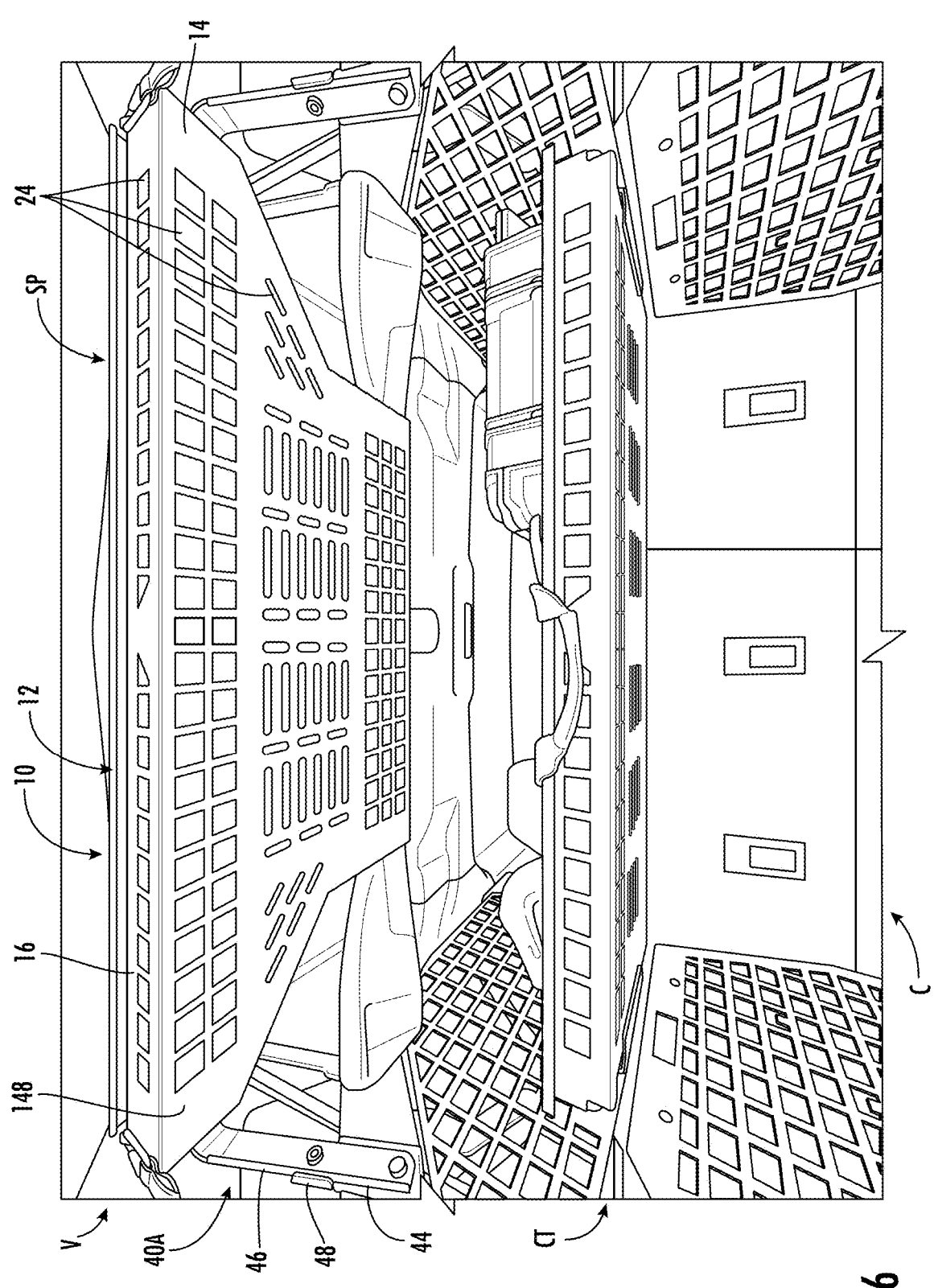
FIG. 6 illustrates a perspective views of a rear cargo area of a vehicle having an embodiment of an attic tray system according to present subject matter installed therein.
Figure 7:
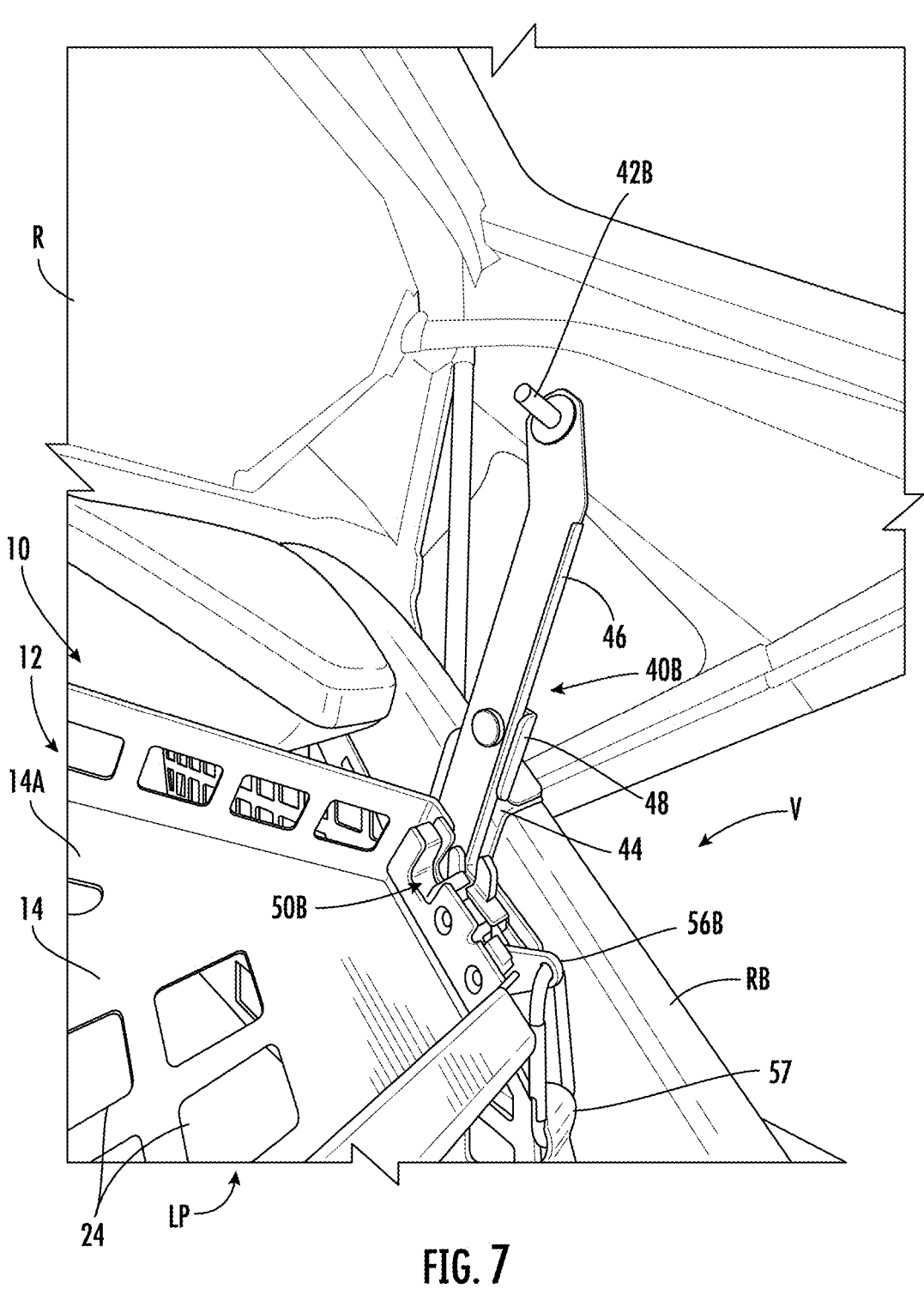
FIGS. 7, 8, and 9 illustrate side perspective views of a portion of an embodiment of an attic tray system installed in a rear cargo area of a vehicle according to present subject matter.
Figure 8:
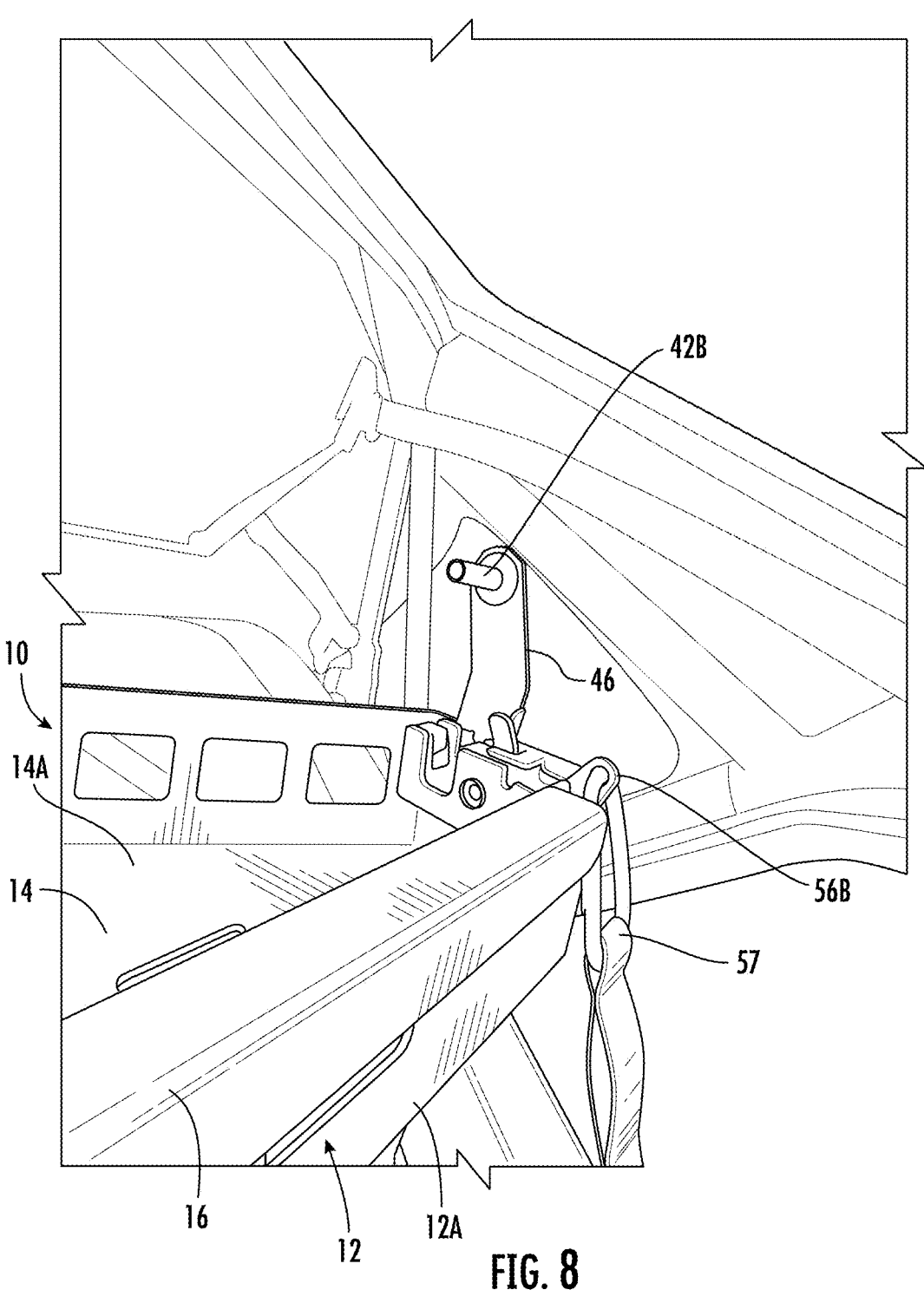
Figure 9:
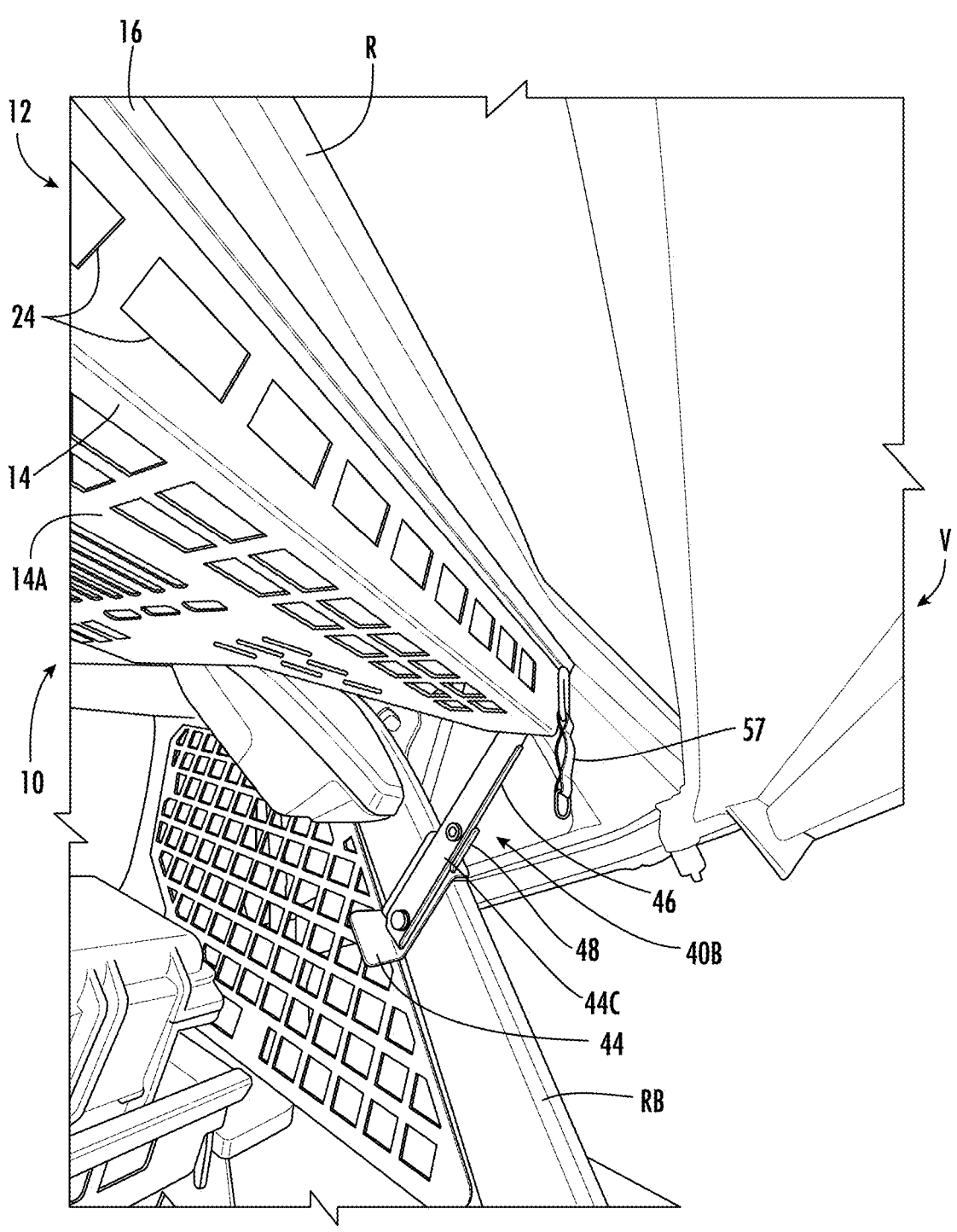
Figure 10:
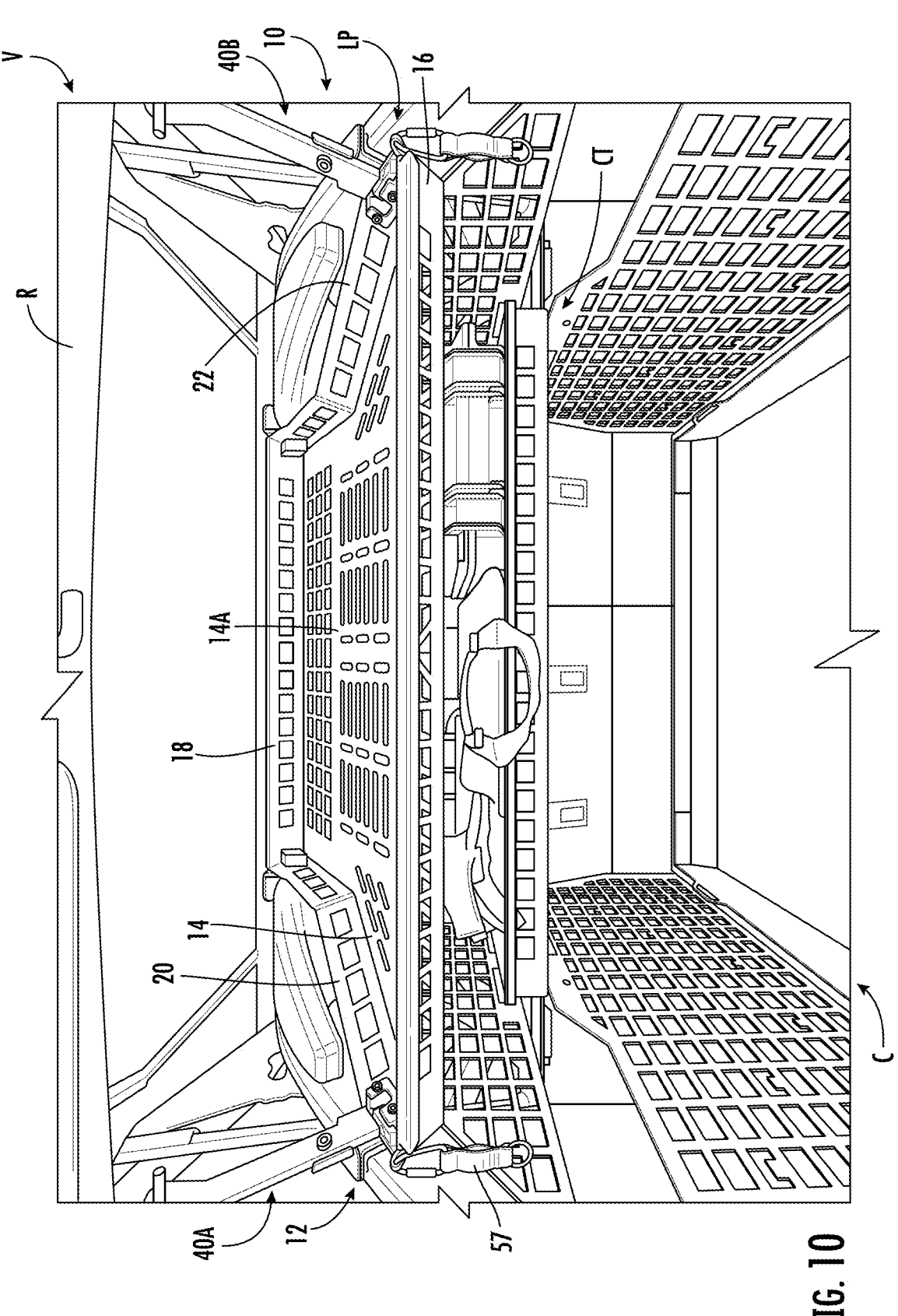
FIGS. 10 and 11 illustrate front perspective views of a portion of an embodiment of an attic tray system installed in a rear cargo area of a vehicle according to present subject matter.
Figure 11:
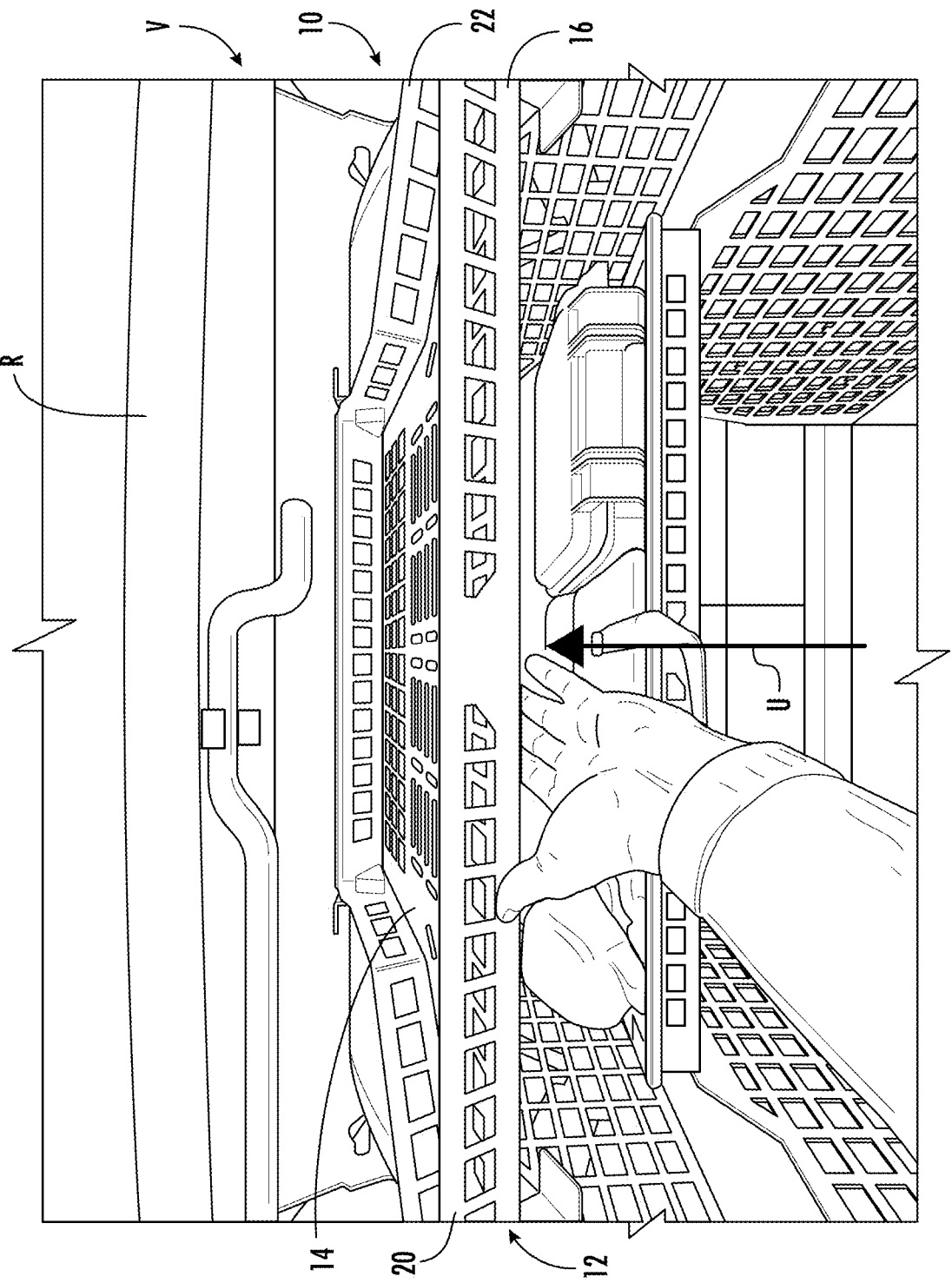

FIGS. 6-11 show the attic tray system 10 in different perspectives of different states of use. FIG. 6 shows the tray body 12 of the attic tray system 10 in the storage position SP with an item stored on the tray bed 14 of the tray body 12. The front holding wall 16, the rear holding wall 18 and the side walls 20, 22 can keep the item on the tray bed 14 during movement of the vehicle V. FIGS. 7 and 10 show a portion of the attic tray system 10 when the tray body 12 is in the loading position LP. As can been seen in FIG. 7, the latch arm connection bracket 46 of the second locking bracket 40B extends above the rollbar RB to which the second locking bracket 40B is attached with the latch arm 42B extending outward from the latch arm connection bracket 46 ready to be engaged by the second latch 50B secured tot eh tray body 12. The latch arm connection bracket 46 is supported by the vehicle connection bracket 44 and the bracing bracket 48. FIGS. 8 and 11 show the front end 12A of the tray body 12 being lifted upward so that the rear end 12B of the tray body rotated around the pivots 33 of the first and second rear pivot brackets 30A, 30B as the tray body 12 is moved toward the storage position SP. FIG. 9 shows the tray body 12 of the attic tray system 10 in the storage position SP. The release levers 56A, 56B of the respective first and second latches 50A, 50B can have pulls 57 thereon as shown in FIGS. 7-10 to quickly release the first and second latches 50A, 50B from the respective latch arm 42A, 42B to permit the tray bed to be moved from the storage position SP to the loading position LP and allow the tray body 12 to rest on the tray rests 44C of the first and second locking brackets 40A, 40B. In some embodiments, the first and second locking brackets 40A, 40B can each be a singular, unitary bracket. Other methods of assembly and use in addition to the those already provided can be derived from the drawings and description provided above.

Referring to FIGS. 12A-13C, two additional attic tray systems 110 for a rear cargo area of a vehicle are provided. The attic tray systems 110 are similar in construction and operation so the same reference numerals are used. Each attic tray system 110 can comprise the tray body 112 with the tray bed 114 that forms the first tray bed surface 114A on which items can be loaded and can have a second opposing tray bed surface (not shown). The tray body 112 can have a front end 112A, rear end 112B, and first and second sides 112C, 112D. As shown in FIGS. 12A-13C, the tray body 112 can comprise a front holding wall 116 extending upward from the front end 112A of the tray body 112 above the first tray bed surface 114A and a rear holding wall 118 extending upward from the rear end 112B of the tray body 112 above the first tray bed surface 114A. The tray body 112 can comprise first and second side walls 120, 122 that extend between the front and rear holding walls 116, 118. As can be seen in FIGS. 12A-13C, in some embodiments, the tray body 112 can comprise MOLLE apertures 124 on at least one of the tray bed 114, the first and second side walls 120, 122, the front holding wall 116 or the rear holding wall 118.

Figure 13A:
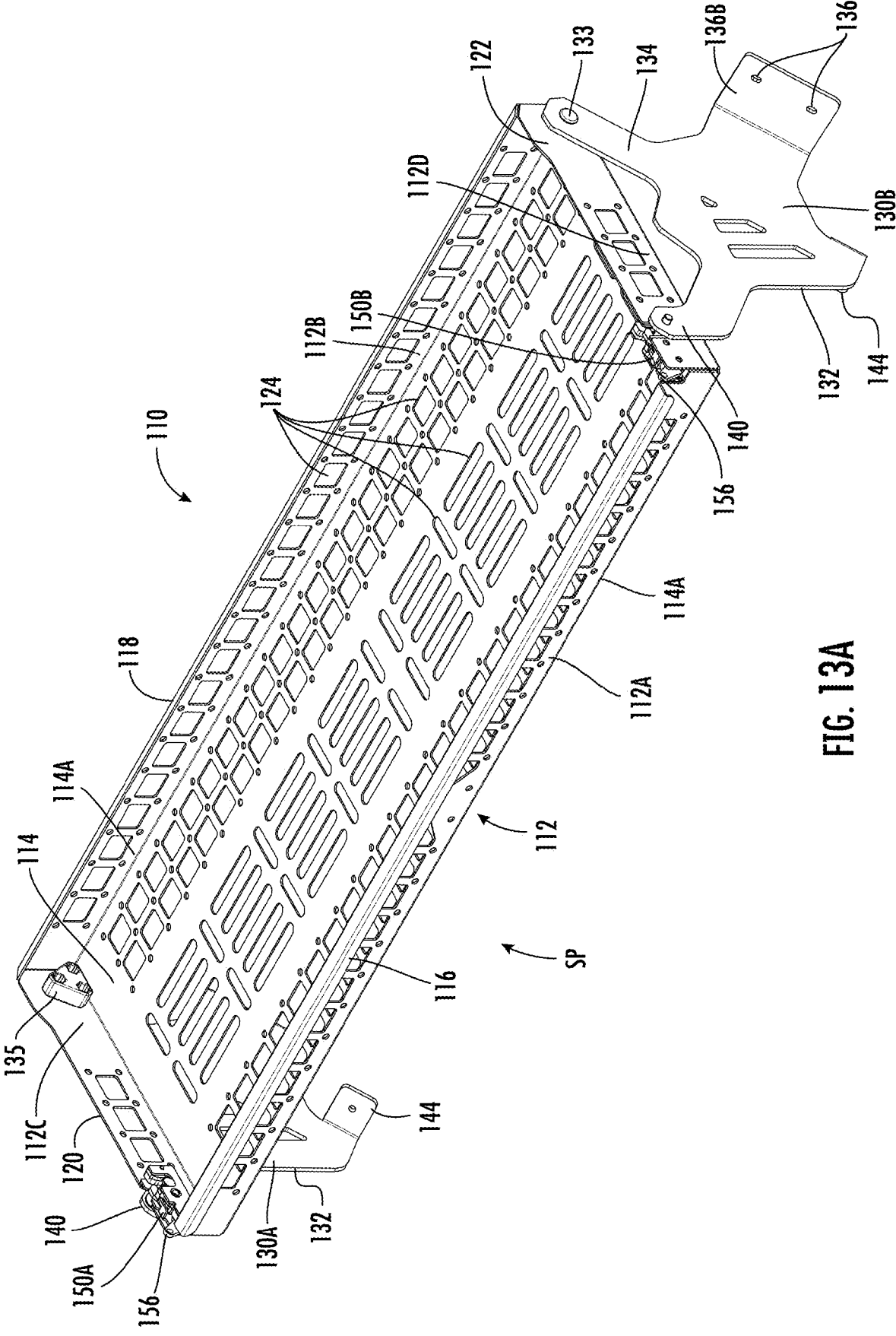
FIG. 13A illustrates a perspective view of an embodiment of an attic tray system in a storage position according to the present subject matter.
Figure 13B:
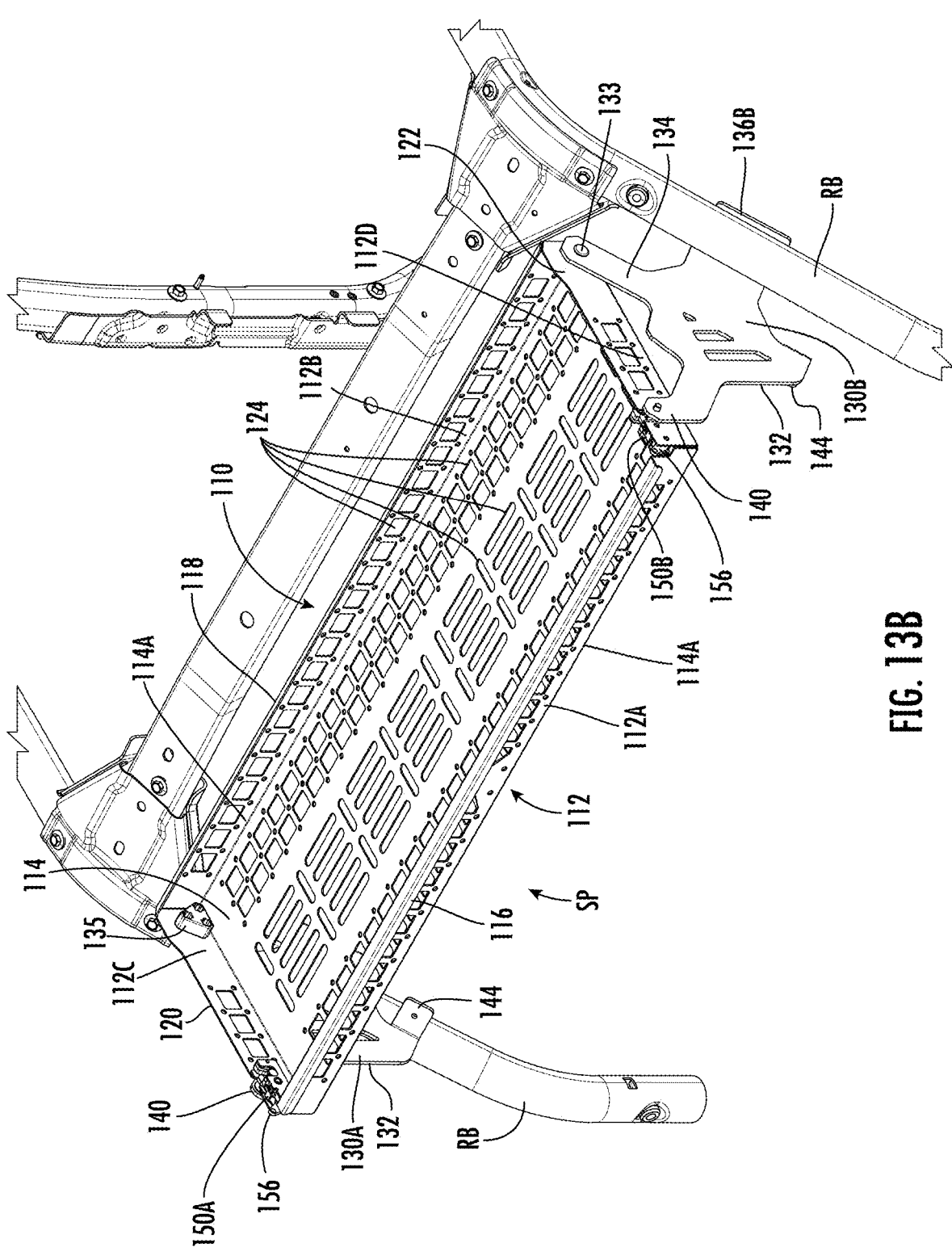
FIG. 13B illustrates a top perspective view of the embodiment of the attic tray system in a storage position according to FIG. 13A attached to a roll bar of a vehicle.
Figure 13C:
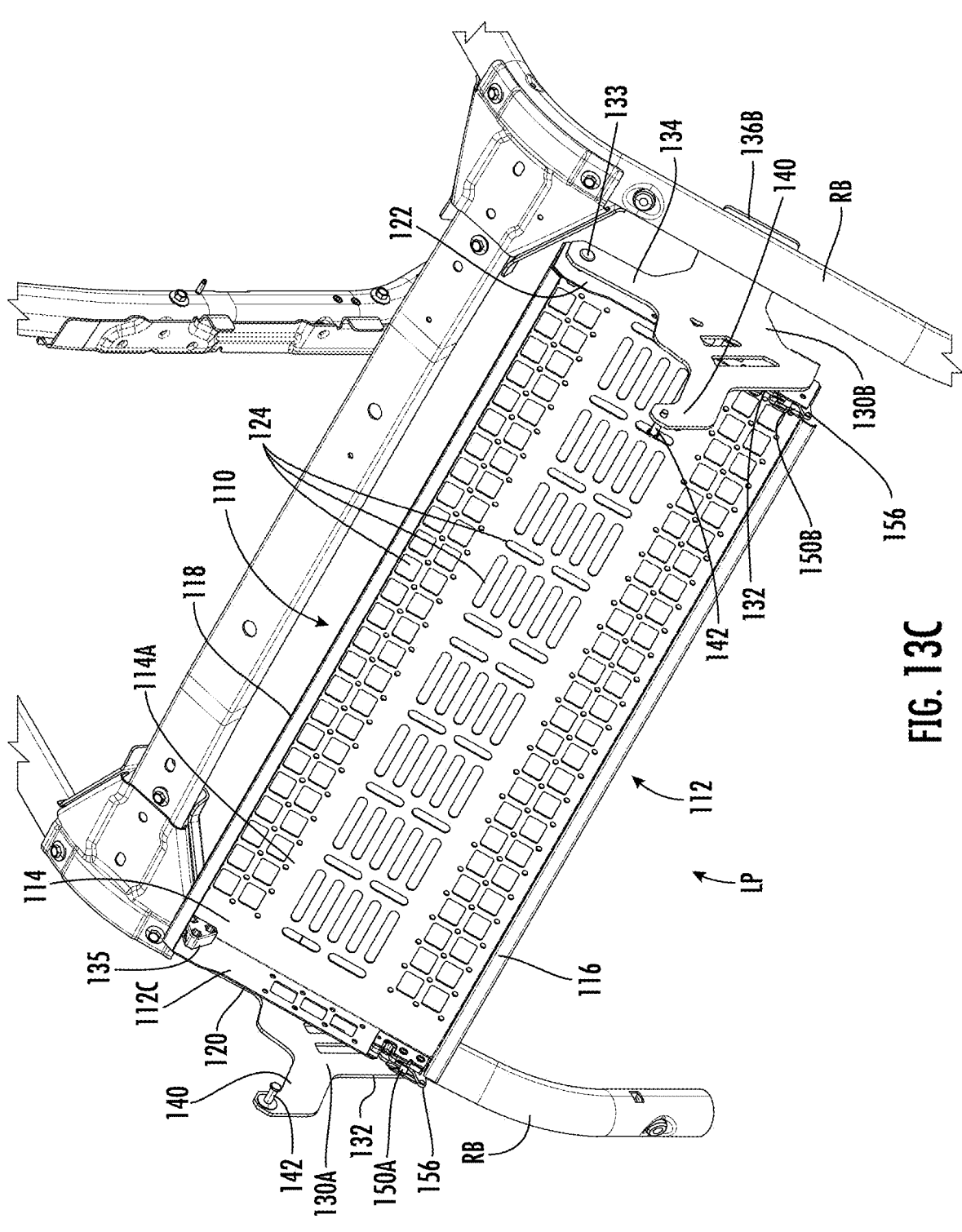
FIG. 13C illustrates a top perspective view of the embodiment of the attic tray system in a loading position according to FIG. 13B.

The attic tray system 110 can comprise at least two brackets 130A, 130B for supporting the tray body 112 in a storage position. Each of the least two brackets 130A, 130B can be secured to a portion of a vehicle, such as rollbars RB shown in FIGS. 13B and 13C, on either of the first side 112C or the second side 112D of the tray body 112, respectively. For example, the brackets 130A, 130B can be secured within the vehicle near a roof of the vehicle. The bracket bodies 132 can have holding apertures 136 for receiving fasteners (not shown) to secure the respective brackets 130A, 130B to the vehicle, for example, the roll bars RB. In some embodiments as shown in FIGS. 13A-13C, for example, the bracket bodies 132 can have a holding flange 136B that extends outward holding apertures 136. Depending on the design and the vehicle, such a holding flange 136B can extend outward from either side of the bracket bodies 132.

Figure 12A:
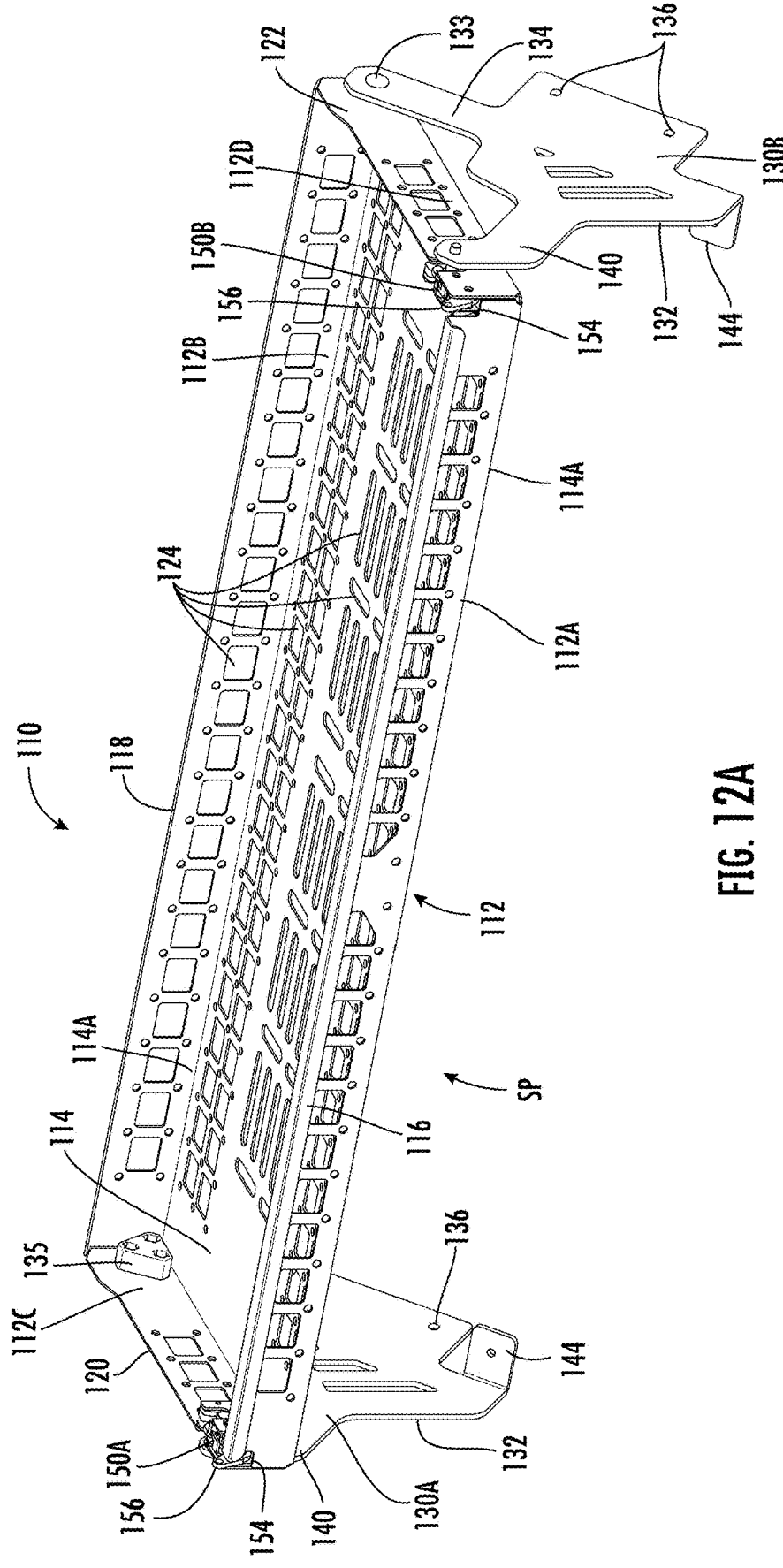
FIG. 12A illustrates a perspective view of an embodiment of an attic tray system in a storage position according to the present subject matter.
Figure 12B:
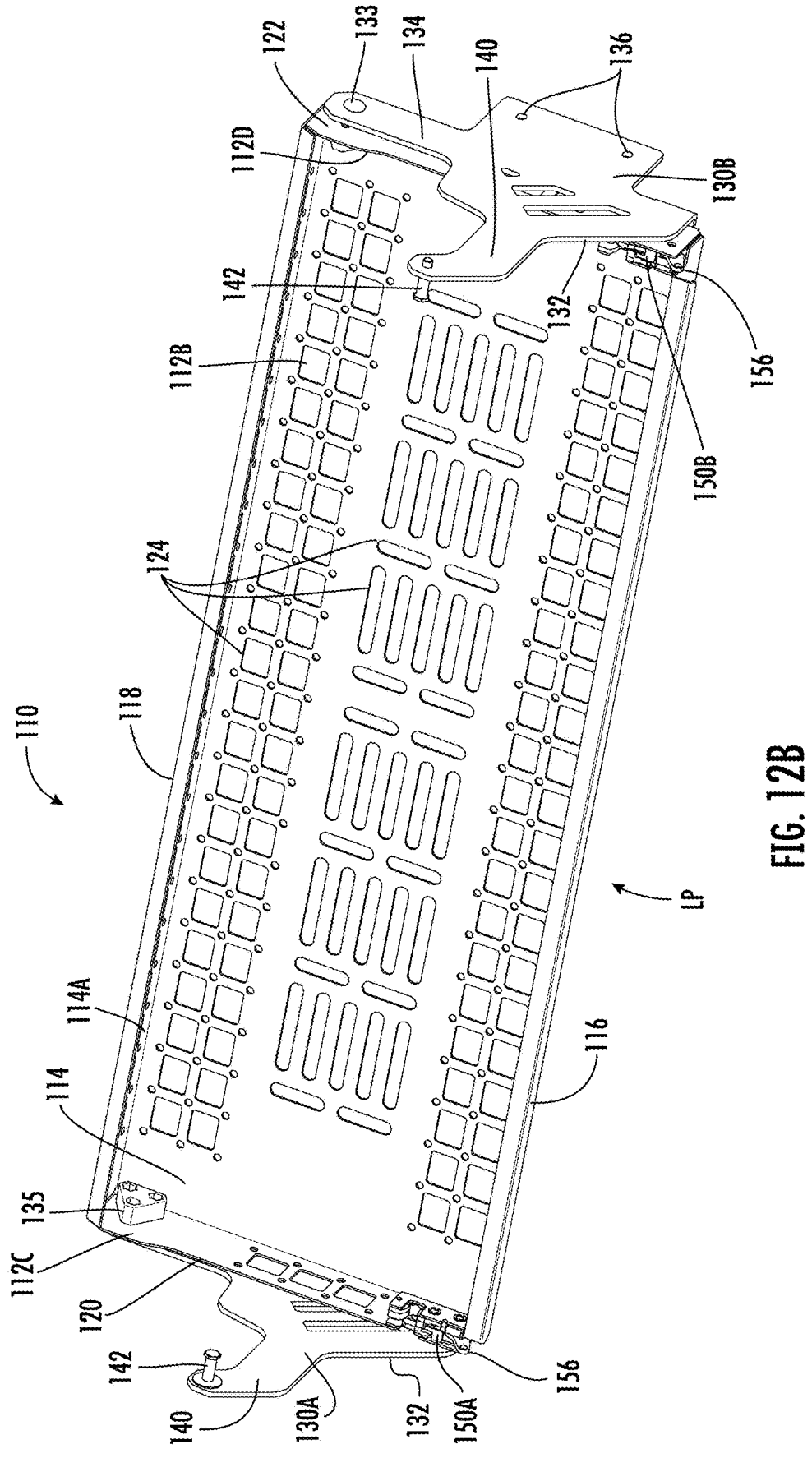
FIG. 12B illustrates a top perspective view of the embodiment of the attic tray system in a loading position according to FIG. 12A.

The brackets 130A, 130B can be attached to the first and second sides 112C, 112D of the tray body 112, respectively, such that the tray body 112 can be rotated about the brackets 130A, 130B between the storage position SP and the loading position LP as shown in FIGS. 12A, 12B, 13B, and 13C. In some embodiments, the first bracket 130A can be secured to the first side wall 120 proximate the rear holding wall 118 and the second bracket 130B can be secured to the second side wall 122 proximate the rear holding wall 118. In this manner the tray body 112 can pivot along an axis formed by the connection between the side walls 120, 122 and the brackets 130A, 130B between the storage position SP and the loading position LP. For example, the brackets 130A, 130B can each have a pivot portion 134, respectively, that can be rotatably attached to the first and second sides 112C, 112D of the tray body 112, respectively. In some embodiments as shown, the pivot portion 134 can extend outward from a rear portion of the bracket body 132 of the respective brackets 130A, 130B. Each pivot portion 134 can have a pivot 133 that extends therefrom that can engage the first and second sides 112C, 112D of the tray body 112 near the rear end 112B of the tray body 112. The pivots 133 may be unitary monolithic part of the bracket bodies 132 or may be an insert that is attached to the pivot portions 134 of the bracket bodies 132. For example, the pivot portions 134 can have can pivot apertures therein for receiving and securing the pivots 133. In particular, the side walls 120, 122 can have apertures therethrough and the pivots 133 can engage hinge blocks 135 secured to the side walls 120, 122 of the tray body 112 that facilitate the rotation of the tray body 112 about the pivots 133 in the pivot portions 134 of the brackets 130A, 130B. The hinge blocks 135 can and the pivots 133 can allow the tray body 112 to rotate between the storage position SP and the loading position LP. As can be seen in FIGS. 12A, 13A and 13B, each of the brackets 130A, 130B can have a tray rest 144 extending therefrom. Thus, upon installation, each tray rest 144 extends inward from a lower portion of the respective bracket 130A, 130B such that the opposing second tray bed surface of the tray bed 114 of the tray body 112 can rest against the tray rests 144 when the tray body 112 is in the loading position LP.

Further, the attic tray system 110 can comprise a first latch 150A secured to the first side 112C of the tray body 112. The first latch 150A can be configured to engage a first bracket 130A when the tray body 112 is in the storage position SP and disengage the first bracket 130A when the tray body 112 is being moved to a loading position LP. In such embodiments, the first bracket 130A can comprise a latching portion 140 comprising a latch arm 142 configured to engage the first latch 150A on the first side 112C of the tray body 112. In some embodiments as shown in FIGS. 12A-13C, a second latch 150B can be secured to the second side 112D of the tray body 112 with the second latch 150B being configured to engage a second bracket 130B of brackets 130A, 130B when the tray body 112 is in the storage position SP and disengage the second bracket 130B when the tray body 112 is being moved to the loading position LP. In such embodiments, the second bracket 130B can also comprise a latching portion 140 comprising a latch arm 142 configured to engage the second latch 150B on the second side 112D of the tray body 112. Thus, the two brackets 130A, 130B each can comprise a latching portion 140 comprising a latch arm 142 configured to engage the respective first and second latches 150A, 150B on the respective first and second sides 112C, 112D of the tray body 112.

In some embodiments, to protect the first and second latches 150A, 150B and facilitate their engagement and disengagement, each of the first and second side walls 120, 122 of the tray body 112 can comprise a locking channel (not identify in FIGS. 12A-13C) proximate the front holding wall 116. In particular, in such embodiments, the first and second latches 150A, 150B are respectively aligned with the locking channels 52A, 52B of the first and second side walls 120, 122 for receiving a portion of the latching portions 140A, such as the latch arms 142. In some such embodiments as shown in FIG. 12A, the front holding wall 116 can comprise release channels 154 therein in which release levers 156 of the respective first and second latches 150A, 150B extend for releasing the first and second latches 150A, 150B from the latching portions 140 of the brackets 130A, 130B. The latch arms 142 of the latching portion 140 of the bracket bodies 132 of the brackets 130A, 130B can be in an alignment with the pivot portion 134 so that the tray body 112 is held in the storage position SP when the first and second latches 150A, 150B engage the latch arms 142 of the latching portion 140 of the bracket bodies 132 of the brackets 130A, 130B, so that the tray bed 114 of the tray body 112 can be level in storage position SP.

Thus, in some embodiments as provided herein, multiple brackets can be used to form the pivot portion and the latching (or locking) portion on each side of the attic tray systems. In some embodiments as provided herein, a single bracket can be used to form the pivot portion and the latching (or locking) portion on each side of the attic tray systems.

These and other modifications and variations to the present subject matter may be practiced by those of ordinary skill in the art, without departing from the spirit and scope of the present subject matter, which is more particularly set forth herein above and any appending claims. In addition, it should be understood the aspects of the various embodiments may be interchanged either in whole or in part. Furthermore, those of ordinary skill in the art will appreciate that the foregoing description is by way of example only, and is not intended to limit the present subject matter. Accordingly, the specification and figures are to be regarded in an illustrative rather than a restrictive sense, and all such modifications are intended to be included within the scope of present teachings.

What is claimed is:

1. An attic tray system for a rear cargo area of a vehicle, the attic tray system comprising:

a tray body comprising a tray bed that forms a first tray bed surface, the tray body having a front end, rear end and first and second sides;

at least two brackets, the least two brackets for supporting the tray body in a storage position, each of the least two brackets securable to a portion of a vehicle on either the first side or the second side of the tray body respectively; and a first latch secured to the first side of the tray body, the first latch configured to engage a first bracket of the least two brackets when the tray body is in the storage position and disengage the first bracket of the least two brackets when the tray body is being moved to a loading position.

2. The attic tray system according to claim 1, wherein the at least two brackets each comprise a tray rest extending therefrom such that upon installation, the tray rest extend inward from a lower portion of the respective bracket such that an opposing second tray bed surface of the tray body rests against the tray rests when the tray body is in the loading position.

3. The attic tray system according to claim 1, wherein the at least two brackets each comprise a pivot portion respectively rotatably attachable to the first and second sides of the tray body, respectively, such that the tray body is rotatable between the storage position and the loading position about the at least two brackets.

4. The attic tray system according to claim 1, wherein the tray body further comprises a front holding wall extending upward from the front end of the tray body above the first tray bed surface and a rear holding wall extending upward from the rear end of the tray body above the first tray bed surface.

5. The attic tray system according to claim 4, wherein the tray body further comprises first and second side walls that extend between the front and rear holding walls.

6. The attic tray system according to claim 5, wherein the first and second side walls of the tray body comprise a locking channel proximate the front holding wall.

7. The attic tray system according to claim 5, wherein the tray body further comprises MOLLE apertures on at least one of the tray bed, the first and second side walls, the front holding wall, or the rear holding wall.

8. An attic tray system for a rear cargo area of a vehicle, the attic tray system comprising:

a tray body comprising a tray bed that forms a first tray bed surface, the tray body having a front end, rear end and first and second sides;

at least two brackets, the least two brackets for supporting the tray body in a storage position, each of the least two brackets securable to a portion of a vehicle on either the first side or the second side of the tray body respectively;

a first latch secured to the first side of the tray body, the first latch configured to engage a first bracket of the least two brackets when the tray body is in the storage position and disengage the first bracket of the least two brackets when the tray body is being moved to a loading position; and a second latch secured to the second side of the tray body, the second latch configured to engage a second bracket of the least two brackets when the tray body is in the storage position and disengage the second bracket when the tray body is being moved to the loading position.

9. The attic tray system according to claim 8, wherein the at least two brackets each comprise a latching portion comprising a latch arm configured to engage the respective first and second latches on the respective first and second sides of the tray body.

10. The attic tray system according to claim 8, wherein the first latch is position along the first side wall proximate to the front holding wall and the second latch is position along the second side wall proximate the front holding wall.

11. The attic tray system according to claim 10, wherein each of the first and second side walls of the tray body comprise a locking channel proximate the front holding wall.

12. The attic tray system according to claim 11, wherein the first and second latches are respectively aligned with the locking channels of the first and second side walls for receiving portions of the respective first and second locking brackets.

13. The attic tray system according to claim 12, the front holding wall comprises release channels therein in which release levers of the respective first and second latches extend for releasing the first and second latches from the respective first and second locking bracket.

14. An attic tray system for a rear cargo area of a vehicle, the attic tray system comprising:

a tray body comprising a tray bed that forms a first tray bed surface, the tray body having a front end, rear end and first and second sides;

at least two brackets, the least two brackets for supporting the tray body in a storage position, each of the least two brackets securable to a portion of a vehicle on either the first side or the second side of the tray body respectively; and a first latch secured to the first side of the tray body, the first latch configured to engage a first bracket of the least two brackets when the tray body is in the storage position and disengage the first bracket of the least two brackets when the tray body is being moved to a loading position; and wherein the at least two brackets comprise:

first and second rear pivot brackets, the first and second rear pivot brackets securable to a portion of a vehicle and respectively rotatably attachable to the first and second sides of the tray body respectively, such that the tray body is rotatable between the storage position and the loading position about the first and second rear pivot brackets;

first and second locking brackets for supporting the tray body in the storage position, each of the first and second locking brackets securable to a portion of a vehicle on either the first side or the second side of the tray body, respectively.

15. The attic tray system according to claim 14, wherein and the first rear pivot bracket is secured to the first side wall proximate the rear holding wall and the second rear pivot bracket is secured to the second side wall proximate the rear holding wall.

16. The rear cargo tray system according to claim 14, wherein each of the first and second locking brackets comprise a vehicle connection bracket and a latch arm connection bracket, the vehicle connection bracket configured to secure to a portion of the vehicle in which the attic tray system is being installed and the latch arm connection bracket comprising a latch arm that is engageable with one of the first or second latches and configured to be secure to the vehicle connection bracket such that the latch arm of the latch arm connection bracket is in an alignment with the respective first or second rear pivot bracket so that the tray body is held in the storage position when the first and second latches engage the latch arms of the latch arm connection brackets of first and second locking brackets.

17. The attic tray system according to claim 16, wherein each of the vehicle connection brackets of the first and second locking brackets has a tray rest extending therefrom such that upon installation, the tray rest extend inward from and below respective latch arm connect bracket such that the opposing second tray bed surface of the tray body rests against the tray rests when the tray body is in the loading position.

18. The attic tray system according to claim 17, wherein the vehicle connection brackets of the first and second locking brackets are securable to opposing roll bars of the vehicle and the latch arm connection brackets extend above the respective roll bars such that the latch arms are above the respective roll bars.

19. The attic tray system according to claim 18, wherein each of the vehicle connection brackets of the first and second locking brackets comprise a bracket body and a flange extending outward from the bracket body with the bracket body securable to a side portion of the respective roll bar and the flange securable to a top portioned the respective roll bar.

20. The attic tray system according to claim 19, wherein each of the first and second locking brackets comprise a bracing bracket that comprises a first flange and a second flange extending from the first flange, the first flange of the bracing bracket being securable to the flange of the vehicle connection bracket and the second flange of the bracing bracket being securable to the latch arm connection bracket above the top portion of the roll bar.

\* \* \* \* \*